(12) United States Patent
Knox

(10) Patent No.: US 10,994,484 B2
(45) Date of Patent: May 4, 2021

(54) APPARATUSES AND METHODS FOR FABRICATING PARTS ON A MULTI GANTRY MACHINE DURING ADDITIVE MANUFACTURING

(71) Applicant: Accelerat3d Inc., Austin, TX (US)

(72) Inventor: Riley L. Knox, Austin, TX (US)

(73) Assignee: Accelerate3D Inc., Austin, TX (US)

( * ) Notice: Subject to any disclaimer, the term of this patent is extended or adjusted under 35 U.S.C. 154(b) by 174 days.

(21) Appl. No.: 16/432,028

(22) Filed: Jun. 5, 2019

(65) Prior Publication Data

US 2019/0375156 A1    Dec. 12, 2019

Related U.S. Application Data

(60) Provisional application No. 62/681,413, filed on Jun. 6, 2018.

(51) Int. Cl.
*B29C 64/25* (2017.01)
*B29C 64/118* (2017.01)
(Continued)

(52) U.S. Cl.
CPC ............ *B29C 64/25* (2017.08); *B29C 64/118* (2017.08); *B29C 64/209* (2017.08);
(Continued)

(58) Field of Classification Search
CPC ..... B29C 64/25; B29C 64/118; B29C 64/245; B29C 64/209; B29C 64/329;
(Continued)

(56) References Cited

U.S. PATENT DOCUMENTS

| 8,827,684 B1 | 9/2014 | Schumacher et al. |
| 2011/0136303 A1 | 6/2011 | Lee |

(Continued)

FOREIGN PATENT DOCUMENTS

| CN | 204622621 U | * 9/2015 |
| WO | 1995/34468 A1 | 12/1995 |

OTHER PUBLICATIONS

English translation of CN-204622621-U by EPO (Year: 2015).*
International Search Report dated Aug. 23, 2019 of corresponding International PCT Application No. PCT/US2019/035615.

*Primary Examiner* — Leith S Shafi
*Assistant Examiner* — Inja Song
(74) *Attorney, Agent, or Firm* — Akerman LLP

(57) ABSTRACT

According to one embodiment, an additive manufacturing device includes a frame; a first gantry; and a first carriage. The first gantry has a length that extends along a first horizontal dimension of the frame. The first gantry is configured to move back and forth along a second horizontal dimension of the frame. The first carriage is configured to move back and forth along the length of the first gantry. The device further includes a second gantry, and a second carriage. The second gantry has a length that extends along the first horizontal dimension. The second gantry is configured to move back and forth along the second horizontal dimension. The second carriage is configured to move back and forth along the length of the second gantry. The device also includes a flowable material deliverer coupled to the first carriage; and a flowable material depositer coupled to the second carriage.

20 Claims, 17 Drawing Sheets

(51) Int. Cl.
*B29C 64/245* (2017.01)
*B29C 64/209* (2017.01)
*B29C 64/329* (2017.01)
*B33Y 10/00* (2015.01)
*B33Y 30/00* (2015.01)
*B33Y 40/00* (2020.01)
*B29K 27/18* (2006.01)

(52) U.S. Cl.
CPC .......... *B29C 64/245* (2017.08); *B29C 64/329* (2017.08); *B29K 2027/18* (2013.01); *B33Y 10/00* (2014.12); *B33Y 30/00* (2014.12); *B33Y 40/00* (2014.12)

(58) Field of Classification Search
CPC ..... B29C 64/321; B29C 64/227; B33Y 40/00; B33Y 10/00; B33Y 30/00; B33Y 40/10; B29K 2027/18; B65H 2405/423; B25J 9/026
See application file for complete search history.

(56) References Cited

U.S. PATENT DOCUMENTS

| | | | |
|---|---|---|---|
| 2015/0328837 A1* | 11/2015 | Ventolina Cordero | B29C 64/106 425/132 |
| 2016/0144564 A1* | 5/2016 | Padgett | B29C 64/232 425/113 |
| 2016/0318248 A1* | 11/2016 | Susnjara | B25J 9/026 |
| 2016/0368218 A1 | 12/2016 | Cruz et al. | |
| 2017/0151704 A1* | 6/2017 | Go | B20C 64/209 |
| 2018/0154437 A1* | 6/2018 | Mark | B22F 1/0085 |
| 2019/0118467 A1* | 4/2019 | Neboian | B29C 64/118 |
| 2019/0308370 A1* | 10/2019 | Lyckfeldt | B29C 64/20 |

\* cited by examiner

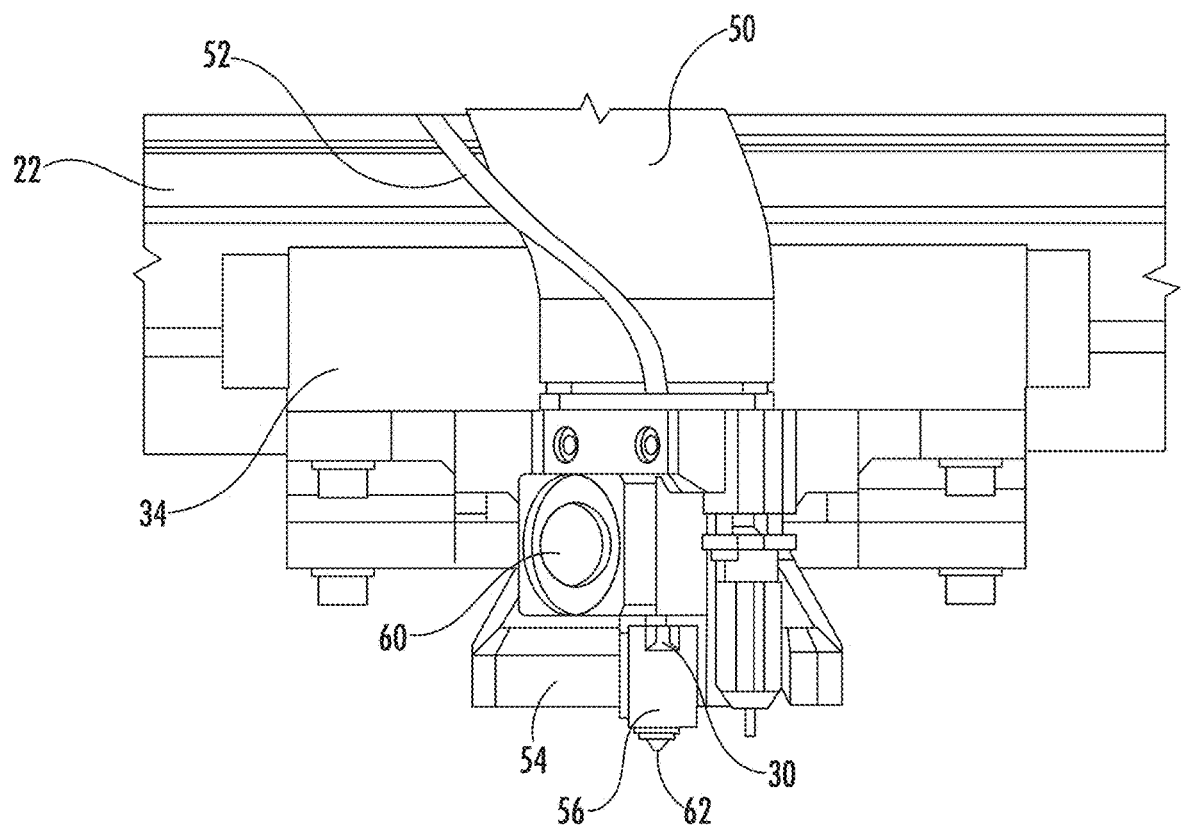
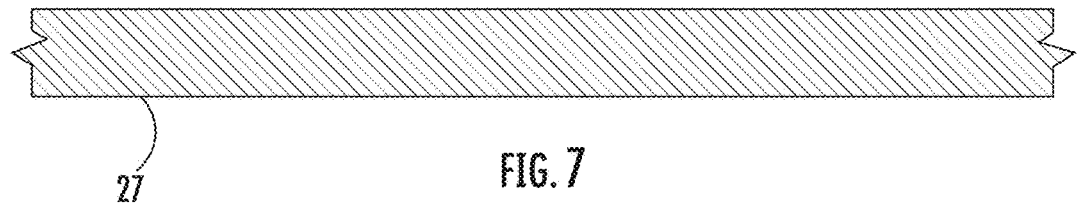
FIG. 7

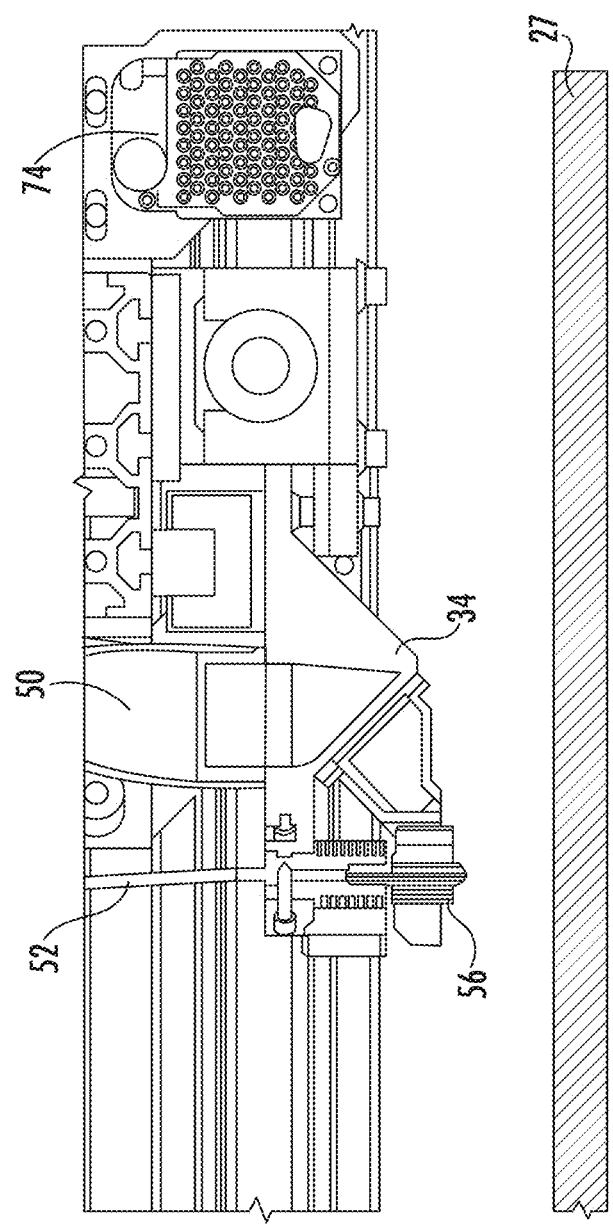

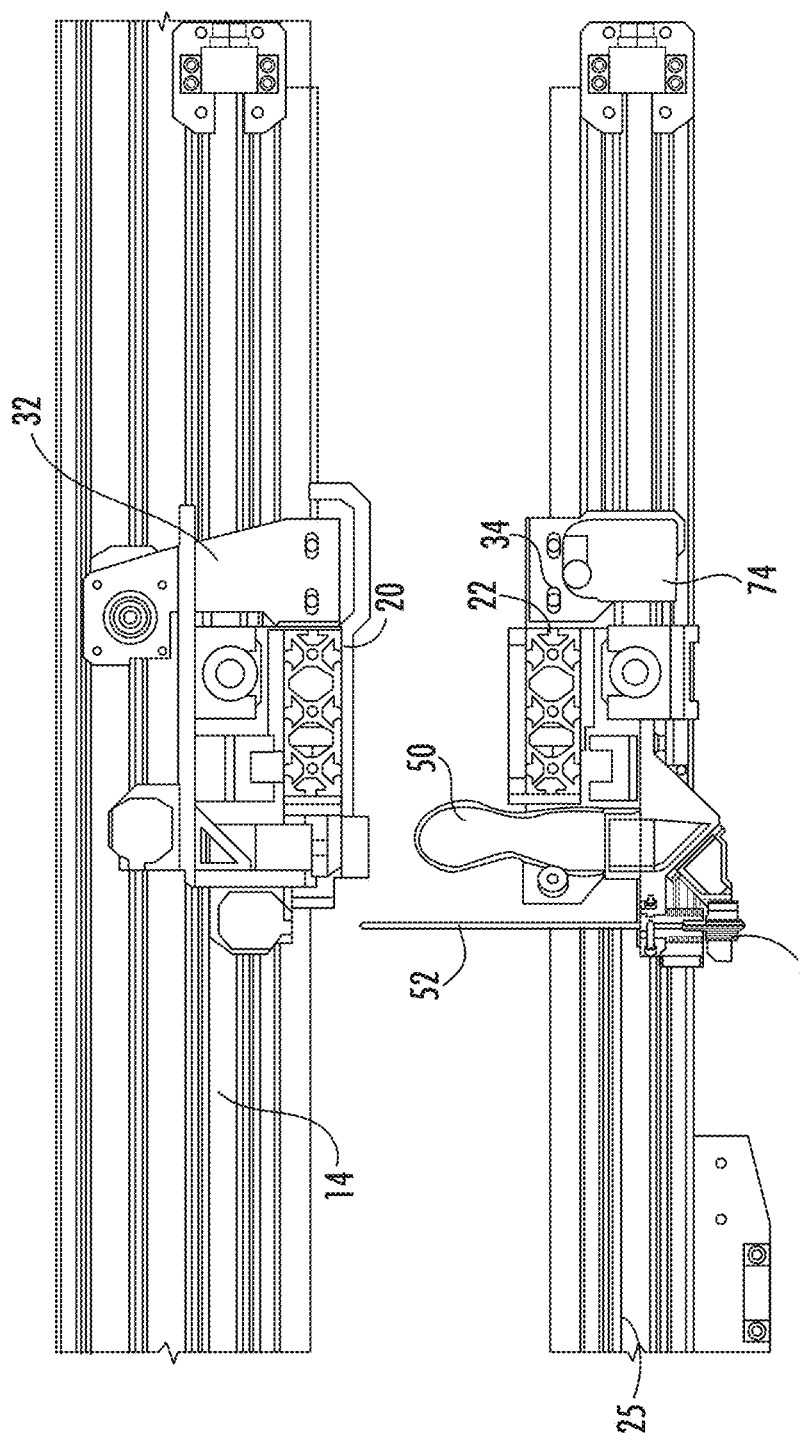

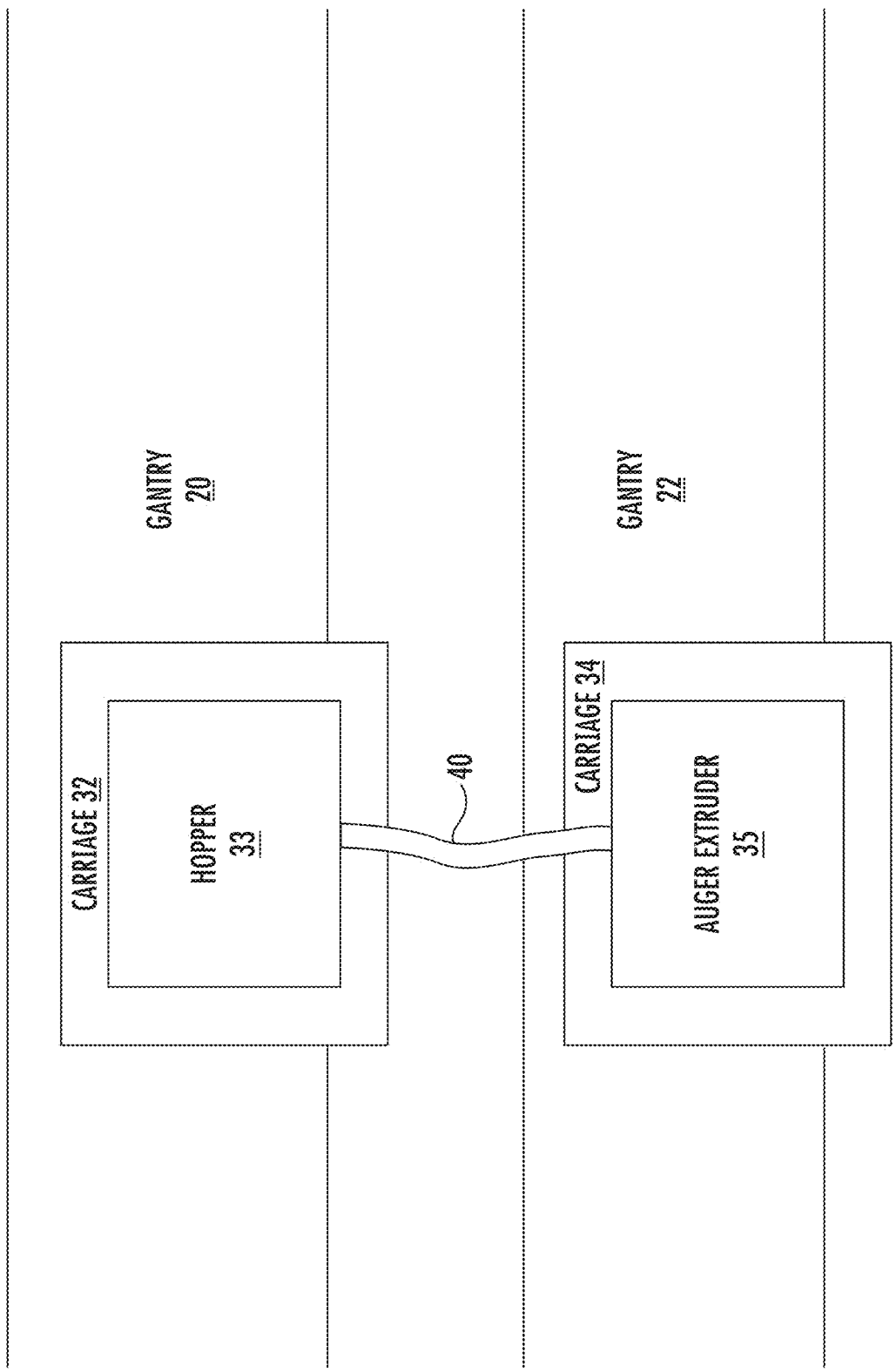

APPARATUSES AND METHODS FOR FABRICATING PARTS ON A MULTI GANTRY MACHINE DURING ADDITIVE MANUFACTURING

CROSS REFERENCE TO RELATED APPLICATIONS

This application claims priority to U.S. Provisional Patent Application No. 62/681,413, filed Jun. 6, 2018, the entirety of which is incorporated herein by reference.

TECHNICAL FIELD

This disclosure relates generally to apparatuses and methods for fabricating three-dimensional ("3D") components. In some instances, embodiments of the present disclosure relate to apparatuses and methods for fabricating components, such as, e.g., machine components, consumer products, vehicle parts, medical devices, electronic components, etc. with a multi gantry machine via additive manufacturing techniques or processes, such as, e.g., 3D printing manufacturing techniques or processes.

BACKGROUND

Additive manufacturing techniques and processes generally involve the buildup of one or more materials, e.g., printing a desired part or component layer by layer, to make a net or a near net shape ("NNS") object. Additive manufacturing encompasses various manufacturing and prototyping techniques known under a myriad of names, including, e.g., freeform fabrication, fused filament fabrication, 3D printing, rapid prototyping, fused deposition modeling, etc. Additive manufacturing techniques may be used to fabricate simple or complex parts or components from numerous materials. In some cases, a part may be fabricated with the assistance of a computer controller (e.g., CAD, 3D files, etc.). Typical apparatuses and methods for additive manufacturing, however, may be deficient.

SUMMARY

According to one embodiment, an additive manufacturing device (such as computer numerical control (CNC) machine for an additive manufacturing process) includes a frame; a worktable coupled to the frame; a first gantry coupled to the frame; and a first carriage coupled to the first gantry. The first gantry has a length that extends along a first horizontal dimension of the frame. The first gantry is configured to move back and forth along a second horizontal dimension of the frame. The first carriage is configured to move back and forth along the length of the first gantry in the first horizontal dimension of the frame. The device further includes a second gantry coupled to the frame, and a second carriage coupled to the second gantry. The second gantry has a length that extends along one of the first horizontal dimension of the frame and the second horizontal dimension of the frame. The second gantry is configured to move back and forth along the other of the first horizontal dimension of the frame and the second horizontal dimension of the frame. The second carriage is configured to move back and forth along the length of the second gantry. The device also includes a flowable material deliverer coupled to the first carriage; a flowable material depositer coupled to the second carriage; and a tube coupling the flowable material deliverer of the first carriage to the flowable material depositer of the second carriage. The tube is configured to guide a flowable material from the flowable material deliverer to the flowable material depositer. The flowable material depositer is configured to at least partially melt the flowable material for deposit on the worktable or on an object on the worktable.

In another embodiment of the device, the flowable material deliverer is an extruder configured to provide the flowable material to the flowable material depositer through the tube, and the flowable material depositer is a hotend. In another embodiment, the flowable material deliverer is a hopper configured to store a supply of the flowable material for providing to the flowable material depositer through the tube, and the flowable material depositer is an auger extruder.

In another embodiment of the device, the worktable is configured to move upward and downward along a vertical dimension of the frame. In a further embodiment, the tube is a Polytetrafluoroethylene (PTFE) tube. In a further embodiment, the tube is a short tube having a length less than or equal to 500 millimeters. In another embodiment, the tube has a length greater than 500 millimeters.

In another embodiment of the device, the first gantry is a top gantry, and the second gantry is a bottom gantry positioned in a location that is vertically below the top gantry in the vertical dimension of the frame. In a further embodiment, the location of the bottom gantry is vertically below the top gantry in the vertical dimension of the frame by about 100 millimeters to about 150 millimeters.

In another embodiment of the device, the second gantry, the second carriage, the flowable material depositer, and any other components coupled to the second gantry have a combined weight that is less than a combined weight of the first gantry, the first carriage, the flowable material deliverer, and any other components coupled to the first gantry.

In another embodiment, the device further includes a blower fan coupled to the first carriage; a shroud coupled to the second carriage; and a flexible blow hose coupling the blower fan of the first carriage to the shroud of the second carriage. In a further embodiment, the shroud at least partially surrounds the flowable material depositer.

In another embodiment, the second carriage and the second gantry are configured to follow a tool path of a component being manufactured; and the first carriage and the first gantry are configured to follow a modified tool path of the component being manufactured. In a further embodiment, the modified tool path reduces acceleration and drive forces of the first carriage and the first gantry.

In another embodiment of the device, the frame is shaped as a box. In a further embodiment, the flowable material deliverer is coupled on or in the first carriage, and the flowable material depositer is coupled on or in the second carriage. In a further embodiment, the flowable material comprises thermoplastic pellets, metallic-filled filaments, thermosets, or concrete. In another embodiment, the length of the second gantry extends along the first horizontal dimension of the frame, and the second gantry is configured to move back and forth along the second horizontal dimension of the frame. In a further embodiment, the length of the second gantry extends along the second horizontal dimension of the frame, and the second gantry is configured to move back and forth along the first horizontal dimension of the frame.

In another embodiment, both the first gantry and the second gantry are powered. In another embodiment, the first gantry is non-powered and the second gantry is powered.

According to another embodiment, a method includes coupling a worktable to a frame of an additive manufacturing device, coupling a first gantry to the frame so that a length of the first gantry extends along a first horizontal dimension of the frame, and coupling a first carriage to the first gantry. The first gantry is configured to move back and forth along a second horizontal dimension of the frame. The first carriage is configured to move back and forth along the length of the first gantry in the first horizontal dimension of the frame. The method further includes coupling a second gantry to the frame so that a length of the second gantry extends along one of the first horizontal dimension of the frame and the second horizontal dimension of the frame, and coupling a second carriage to the second gantry. The second gantry is configured to move back and forth along the other of the first horizontal dimension of the frame and the second horizontal dimension of the frame. The second carriage is configured to move back and forth along the length of the second gantry. The method also includes coupling a flowable material deliverer to the first carriage, coupling a flowable material depositer to the second carriage, and coupling a tube to the flowable material deliverer and the flowable material depositer so that the tube couples the flowable material deliverer to the flowable material depositer. The tube is configured to guide a flowable material from the flowable material deliverer to the flowable material depositer. The flowable material depositer is configured to at least partially melt the flowable material for deposit on the worktable or on an object on the worktable.

In another embodiment of the method, the flowable material deliverer is an extruder configured to provide the flowable material to the flowable material depositer through the tube, and the flowable material depositer is a hotend. In another embodiment, the flowable material deliverer is a hopper configured to store a supply of the flowable material for providing to the flowable material depositer through the tube, and the flowable material depositer is an auger extruder.

In another embodiment, the method further includes coupling a blower fan to the first carriage, coupling a shroud to the second carriage, and coupling a flexible blow hose to the blower fan and the shroud so that the flexible blow hose couples the blower fan to the shroud.

According to a further embodiment, an exemplary apparatus described herein includes a machine for producing parts with two powered gantries, where the first powered gantry includes an extruder, and the second powered gantry includes a hotend. In some embodiments of the present disclosure, the first gantry may be disposed above the second gantry. The first (or top) gantry may carry the heavier 3D printing components, such as, for example, the extruder, fans, cables, etc., while the second (or bottom) gantry may carry the hotend and associated mounting structure. In doing so, the hotend, mounted on the second gantry, may be lighter and move around the build volume of the desired 3D printed part with greater acceleration relative to the heavier first gantry.

BRIEF DESCRIPTION OF THE FIGURES

For a more complete understanding of the present disclosure and its features and advantages, reference is now made to the following description, taken in conjunction with the accompanying drawings, in which:

FIG. 7 is an enlarged perspective view of the second carriage of the exemplary CNC machine of FIG. 1;

FIG. 15 is an enlarged cross-sectional view of the exemplary CNC machine of FIG. 1;

FIG. 16 is a cross-sectional view of the exemplary CNC machine of FIG. 1; and

FIG. 17 is a schematic illustration of another exemplary CNC machine for an additive manufacturing process, according to an aspect of the present disclosure.

DETAILED DESCRIPTION

Figure 1:
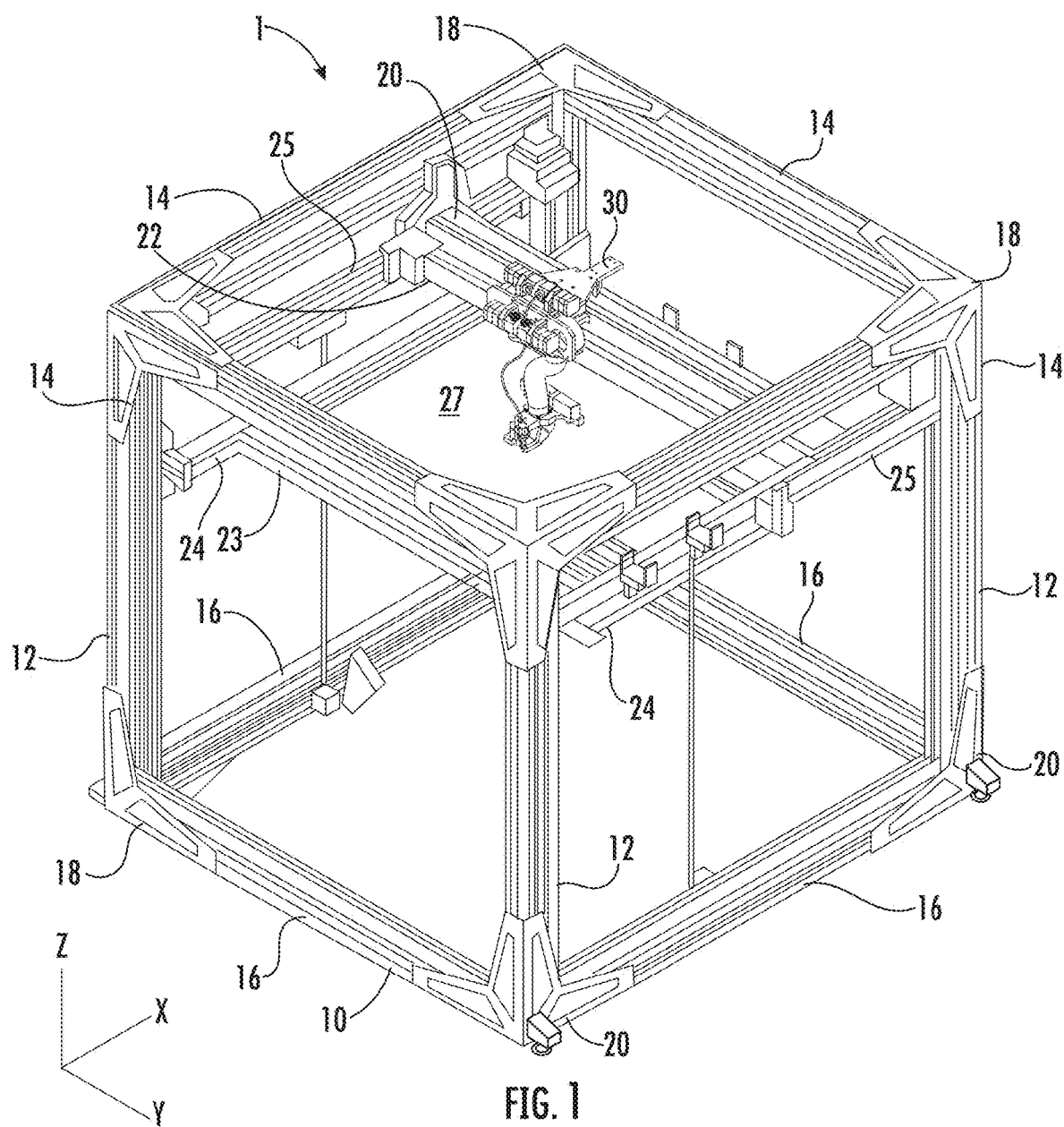
FIG. 1 is a perspective view of an exemplary CNC machine for an additive manufacturing process, according to an aspect of the present disclosure.

Embodiments of the present disclosure are best understood by referring to FIGS. 1-17 of the drawings, like numerals being used for like and corresponding parts of the various drawings.

Additive manufacturing techniques and processes generally involve the buildup of one or more materials, e.g., printing a desired part or component layer by layer, to make a net or a NNS object. Additive manufacturing encompasses various manufacturing and prototyping techniques known under a myriad of names, including, e.g., freeform fabrication, fused filament fabrication, 3D printing, rapid prototyping, fused deposition modeling, etc. Additive manufacturing techniques may be used to fabricate simple or complex parts or components from numerous materials. In some cases, a part may be fabricated with the assistance of a computer controller (e.g., CAD, 3D files, etc.).

A particular type of additive manufacturing, commonly known as 3D printing, is called Fused Filament Fabrication ("FFF"). FFF is a 3D printing process that uses a continuous filament of a thermoplastic material. This process includes taking a filament, in the case of FFF, a general thermoplastic, and then melting the material to then be deposited layer by layer to form a desired printed part. The filament is fed from a large coil, through a moving, heated printer extruder head. Molten material is forced out of the print head's nozzle and is deposited on the growing workpiece. The head is moved, under computer control, to define the printed shape. Generally, the head moves in layers, moving in two dimensions to deposit one horizontal plane at a time, before moving slightly upwards to begin a new slice. The speed of the extruder head may also be controlled, to stop and start deposition and form an interrupted plane without stringing or dribbling between sections.

Another process is called Fused Deposition Modeling ("FDM"), or Fused Layered Modeling ("FLM"), which includes melting a thin layer of thermoplastic material, and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material is applied to the existing structure in layers, melting and fusing with the existing material to produce a solid finished part.

However, typical apparatuses and methods for additive manufacturing may be deficient. For example, typical apparatuses and methods for additive manufacturing may generally include a displaceable gantry. The displaceable gantry may further include a carriage having an extruder (e.g., a device that provides a flowable material to a hotend, either directly or through a tube, such as a Bowden tube) and the hotend (e.g., a heated nozzle or other device that at least partially melts the flowable material and, in some examples, helps maintain a consistent and accurate temperature for successful prints) mounted to the carriage. In many of the described printing approaches mentioned earlier, both the extruder and the hotend are disposed on a single structure (e.g., the same gantry, same carriage, etc.). In such examples, a direct extruder system may be used, where the hotend is directly fixed to the bottom of the extruder. In other examples, the extruder may be positioned remote (or apart) from the hotend, even if they are disposed on a single structure. In such examples, a long filament tube (e.g., long Bowden tube) may be used to connect the extruder to the hotend so that extruded material can be deposited onto a surface for printing a 3D part or object.

The long filament tube (e.g., a long Bowden tube) may also be used when the extruder and the hotend are not on the same structure. For example, the extruder may be mounted on the frame and the hotend may be mounted on the carriage. In such an example, the filament tube (e.g., a long Bowden tube) may be used as a flexible link between the fixed extruder and the moving hotend. However, this long filament tube can create problems during printing, such as, e.g., tangles, catches, lower print resolution, stringing or oozing due to poor retraction, increased extruder pushing resistance, etc. Longer filament tubes may cause entanglement during additive manufacturing processes, for example, during operation of a CNC machine. However, by separating the extruder from the hotend and disposing them on two separate gantries, a shorter filament tube may be used, in some examples. By shortening the filament tube, there may be less chance of entanglement or obstructions when fabricating the printed part, which may be advantageous. Furthermore, by separating the hotend and the extruder on to separate gantries, while keeping them close together on the CNC machine, shorter connections may be necessary (e.g., shorter electrical wiring, fewer cables, etc.) which may reduce the likelihood of any errors during the fabrication process, in some examples. Embodiments of the present disclosure are related to additive manufacturing system (e.g., 3D printer system) having two gantries wherein the extruder and hotend are disposed on separate gantries.

Two separate gantries may permit the CNC machine as taught herein to include a first high mass gantry and a second high acceleration gantry (i.e., lesser in mass than the first high mass gantry), which may be advantageous during fabrication of a 3D printed part or component. In an embodiment, the high mass gantry may follow a modified or optimized tool path, while the high acceleration gantry may follow the tool path to form a printed part. Embodiments of the present disclosure are also related to additive manufacturing systems (e.g., 3D printer systems) having two gantries wherein the first gantry is a high mass gantry and the second gantry is a high acceleration gantry. With this decrease in mass, the second gantry (i.e., high acceleration gantry) is lighter than the first gantry, and may move around the build volume of a 3D printed part with greater acceleration while keeping vibrations low and minimizing the size of the associated drive motors. By minimizing the vibrations, fabrication of a printed part may be improved, which may be advantageous. In an exemplary embodiment, the first high mass gantry may be designed to include heavier parts of the system (e.g., the extruder, and other bulky components), and may be designed to follow a modified tool path that may permit faster and/or more optimized tool paths while the second high acceleration gantry (e.g., the gantry with the hotend) may follow an actual tool path for printing a desired part or component.

An advantage of the CNC machine system described herein is to achieve higher speeds of one or more of the described gantries, which may decrease the total time for printing a final part or component. In some embodiments, the quality of the printed part may improve with proper nozzle size selection, which may improve resolution. Another advantage of the systems taught herein include improved precision when printing and fewer vibrations. Improved precision and fewer vibrations may achieve a better surface finish of a final printed part or component. For example, in one embodiment, the system may operate at 16 times the normal acceleration of an average printer, 40 times the normal acceleration of an average printer, or more. In one embodiment, the system may print 2-10 times faster than a standard desktop printer.

In some embodiments taught herein, executable software may additionally be employed during operation of the CNC machine to generate an optimized tool path for printing a desired 3D part or component in a more reliable or efficient process, which may be advantageous. For example, in an exemplary embodiment, separate gantries as taught herein may operate by the same controller and using the same g-code or firmware based control of the first gantry based on the g-code for the second gantry. In such an example, the hotend of a first gantry may follow a tool path of the actual 3D part or component to be printed, while the extruder of a second gantry may follow a modified tool path. The modified tool path may be used to hasten fabrication time, improve efficiency, and/or result in a 3D part or component with better structural integrity. In some other embodiments, a first gantry may follow a tool path of the actual part to be printed, while a second gantry may follow a modified tool path. In both cases, the modified tool path may be advantageous in that it may act as a low pass filter tool path intended to reduce the accelerations and high drive forces associated with abrupt changes in direction while keeping the extruder "hovering" above the hotend within the allowable distances of the flexible connections (e.g., short filament tube, flexible blow hose, and associated wires, etc.).

The present disclosure is drawn to, among other things, methods, systems and apparatus for fabricating components via additive manufacturing techniques, such as, e.g., 3D printing. Specifically, the apparatus described herein includes a machine for fabricating parts with two powered gantries. The first powered gantry includes a flowable material deliverer (e.g., an extruder, a hopper), and the second powered gantry includes a flowable material depositer (e.g., a hotend, an auger extruder). This structure avoids the need to have the flowable material depositer (e.g., a hotend, an auger extruder) and the flowable material deliverer (e.g., an extruder, a hopper) disposed on a single powered gantry. In some embodiments of the present disclosure, the first gantry may be disposed above the second gantry so that the first gantry may be referred to as the "top" gantry and the second gantry as the "bottom" gantry. In doing so, the first gantry (e.g., top gantry) may carry the heavier components often used in 3D printing, such as, for example, the flowable material deliverer (e.g., an extruder, a hopper), fans, cables, etc., while the second gantry (e.g., bottom gantry) may carry the flowable material depositer (e.g., a hotend, an auger extruder) and associated mounting structure. This may permit the flowable material depositer, mounted on the second gantry, to be lighter and move around the build volume of the desired 3D printed part with greater acceleration relative to the heavier first gantry.

In some embodiments of the present disclosure, the second gantry may include an applicator assembly for delivering a flowable material (e.g., thermoplastic material, metals through the use of metal-filled filaments, etc.) onto a worktable at an orientation (e.g., horizontal, vertical, at an angle, etc.) or onto an object positioned on and being built on the worktable. In some embodiments, the worktable may be adjustable in a z-axis (i.e., in a vertical direction, as is seen in FIG. 1). Systems disclosed herein, and according to embodiments of the present disclosure, may be used to employ any flowable material which may be extruded and/or deposited. For example, flowable materials can include thermoplastics in the form of pellets or metals through the use of metal-filled filaments, based on metal injection molding materials, to then be put through a furnaces process to make full metal parts.

The flowable material deliverer may refer to one or more components of the machine that store, deliver, and/or manage the flowable material prior to it being provided to the flowable material depositer for deposit on the worktable or an object on the worktable. For example, if the machine is using filament as the flowable material, the flowable material deliverer may be an extruder that provides the flowable material to a hotend, either directly or through a tube, such as a Bowden tube. As an example of this, if using a filament, for example, the extruder/extruders may push the filament down a tube and into a hotend/hotends. On the other hand, if the machine is using pellets as the flowable material, the flowable material deliverer may be a hopper that stores a supply of the pellets for providing to an auger extruder through a tube. In other examples, the flowable material deliverer may refer to any other one or more components that store, deliver, and/or manage the flowable material prior to it being provided to the flowable material depositer for deposit on the worktable or an object on the worktable.

The flowable material depositer may refer to one or more components of the machine that at least partially melt the flowable material for deposit on the worktable or on an object on the worktable. For example, if the machine is using filament as the flowable material, the flowable material depositer may be a hotend (e.g., a heated nozzle or other device that at least partially melts the filament and, in some examples, helps maintain a consistent and accurate temperature for successful prints). On the other hand, if the machine is using pellets as the flowable material, the flowable material depositer may be an auger extruder (e.g., a heated nozzle or other device that at least partially melts the filament and, in some examples, helps maintain a consistent and accurate temperature for successful prints). In some examples, the auger extruder may further include a rotatable auger (e.g., powered by a motor) that may provide the pellets to the extruder portion of the auger extruder to be at least partially melted. In other examples, the flowable material depositer may refer to any other one or more components that at least partially melt the flowable material for deposit on the worktable or on an object on the worktable.

When using pellets as the flowable material, the hopper, a pellet collection system, and other necessary components may be operatively connected to the first gantry. In some embodiments, pellets may be fed to a heated auger extruder disposed on the second gantry (e.g., bottom gantry). In some embodiments, one or more cooling shrouds and/or mounting structures may be attached or surround the hotend.

For a design using pellets, in place of filament, the pellets may be fed to a hopper corresponding to the first gantry via a long vacuum tube. Pellets may then be fed from the first gantry down to the heated extruder on the second gantry by a flexible tube at a speed or rate fast enough to keep the plastic flowing; thereby keeping the moving mass of the second gantry as low as possible. In such an example, the second gantry may include the heated auger extruder along with the nozzle, but will not have to carry all the equipment used to get pellets from outside the machine to the hopper, as well as in to the hopper itself. While this system may not necessarily be as light weight as the filament based setup described herein, it will be lighter than other pellet based systems.

In some embodiments, the design using pellets may include a flexible drive shaft for the pellet extruder. This may allow the motor and gearbox for the extruder's auger to be positioned on the first gantry 20 (e.g., the top gantry). The flexible drive shaft may be a fully flexible shaft, such as a shaft similar to that used on The Nimble by Zesty Technologies, or the flexible drive shaft may be an articulating rigid shaft using a telescopic universal joint drive, similar to the drive shaft of a car but with greater precision and range of motion. Use of the flexible drive shaft may reduce the mass on the second gantry 22 for a pellet based system, which may allow for higher accelerations with less vibrations, in some examples. In other embodiments, the motor may be mounted directly to the auger on the second gantry 22.

Flowable materials can, in other examples, include thermosets. Thermosets are one or two-part materials which undergo a curing process to take them on a one way process from a liquid or gel to a rigid or flexible solid. Unlike thermoplastics, thermosets cannot be melted and reformed. In some examples, thermosets can be used as a reinforcement injected into thermoplastics printed parts, printed directly onto the surface of other parts, or be fully standalone prints. When used in the multi-gantry system disclosed herein, the components needed for depositing the material may be positioned on the second gantry (e.g., the bottom gantry, or the bottom carriage of the bottom gantry). All other pumping or material supply components may be positioned on the first gantry (e.g., the top gantry, or the top carriage of the top gantry).

As another example, flowable materials can include concrete. When used in the multi-gantry system disclosed herein, the system would function in a similar way as the above discussed pellet-based system, with the pumping and hopper equipment positioned on the first gantry (e.g., the top gantry, or the top carriage of the top gantry), and the nozzle and flow control valves positioned on the second gantry (e.g., the bottom gantry, or the bottom carriage of the bottom gantry). An extrusion auger could be positioned on either gantry, but would more preferably be positioned on the first gantry, so as to reduce the mass of the second gantry.

An advantage of the present disclosure is a system having two powered gantries to split up the task of moving around the two main parts of an FFF 3D printer system: the hotend and the extruder. In an embodiment, the two gantries are connected via a short filament tube (e.g., a Bowden tube) for the filament, a flexible blower hose for the part cooling, and the associated wires needed for sensors and/or power for the hotend. This configuration permits the second gantry to be as light in weight as possible, while minimizing the problems generally associated with longer filament tubes. Some problems may include a lower print resolution, stringing or oozing of thermoplastic material due to poor retraction, and increased extruder pushing resistance. In some embodiments, the first, or top, gantry carries substantially all of the heavier parts of the system, including: the extruder(s), fan(s), cable(s), and associated attachments. The second, or bottom, gantry carries the hotend and its associated mounting structure. In doing so, the hotend may be moved around to build volume of a part being printed at greater accelerations while keeping vibrations low and minimizing the size of the drive motors due to the decreased mass being moved by the second gantry. In some embodiments, both gantries may be operated by the same controller (e.g., computer controller) and use the same g-code. In some embodiments, machine 1 may include firmware to control the first gantry based on the g-code for the second gantry. The second gantry with the hotend may use a tool path of the actual part while the first gantry with the extruder, and the other heavier parts, may use a modified tool path. The modified tool path may be a low pass filter tool path to reduce the accelerations and high drive forces associated with abrupt changes in the tool path.

With reference to FIG. 1, there is illustrated a computer numerical control (CNC) machine 1 embodying embodiments of the present disclosure. A controller, e.g., computer, processor, or other suitable processing station located external to machine 1 (not shown), may be operably connected to CNC machine 1 for displacing an applicator assembly 30 along a first horizontal direction (e.g., x-axis, such as a longitudinal direction), a second horizontal direction (e.g., y-axis, such as a latitudinal direction), and a vertical direction (e.g., z-axis), in accordance with executable software instructions (e.g., a program, g-code, etc.) inputted or loaded into the controller for executing an additive manufacturing process to form a desired part or component. In some examples, the executable software may be inputted or loaded into the control computer to form a 3D printed part. CNC machine 1 may be configured to print or otherwise build 3D printed parts from digital or computer representations of the desired 3D part to be printed (e.g., AMF, STL format files, etc.), which are loaded into the controller.

With continuing reference to FIG. 1, CNC machine 1 may include a frame 10, which may substantially form the structure of machine 1. Frame 10 may include four legs 12, four top members 14, and four bottom members 16. L-shaped members 18 may be used to mount legs 12 to associated top members 14 and bottom members 16, as shown in FIG. 1. For purposes of orientation of machine 1, the "top" of machine will be associated with top members 14, whereas the "bottom" of machine 1 will be associated with bottom members 16. L-shaped members 18 may also be used to mount top members 14 with associated top members 14 at corners of frame 10, as illustrated. Similarly, L-shaped members 18 may be used to mount bottom members 16 with associated bottom members 16 at corners of frame 10

Frame 10 may be configured and dimensioned to form a substantially box-shaped structure. In some embodiments of the present disclosure, frame 10 may not be an exact cube (e.g., it may be a rectangular box) and dimensions of frame 10 may be determined by the sizes of the components being used in the printer of machine 1. Frame 10 may be formed from extruder aluminum or from any other suitable material (e.g., metal or steel), strong enough to support the mass of the internal components of machine 1, and resist the forces generated by machine 1 during operation (e.g., resist forces generated by machine 1 during printing). L-shaped member 18 may be formed from extruder aluminum or other suitable material described above. In an exemplary embodiment, frame 10 may provide the main structure of machine 1, and may be configured to support all components of machine 1. In some embodiments of the present disclosure, frame members 12, 14, 16, and/or 18 may be mechanically connected, fastened, or otherwise secured to each other in order to resist deflection in any axis during operation of machine 1 (e.g., resist translational motion of machine 1 components along the x-, y-, and/or z-axis). Bolts, pins, welding, and/or adhesives may be employed to achieve such a mechanical connection of frame members. It can be appreciated that although a box-shaped frame is illustrated to facilitate explanation, other frame geometry designs (e.g., cylinder-shaped frame, a spherical-shaped frame, a prism-shaped frame, etc.) may be used to build a platform on which support components may be mounted.

Figure 2:
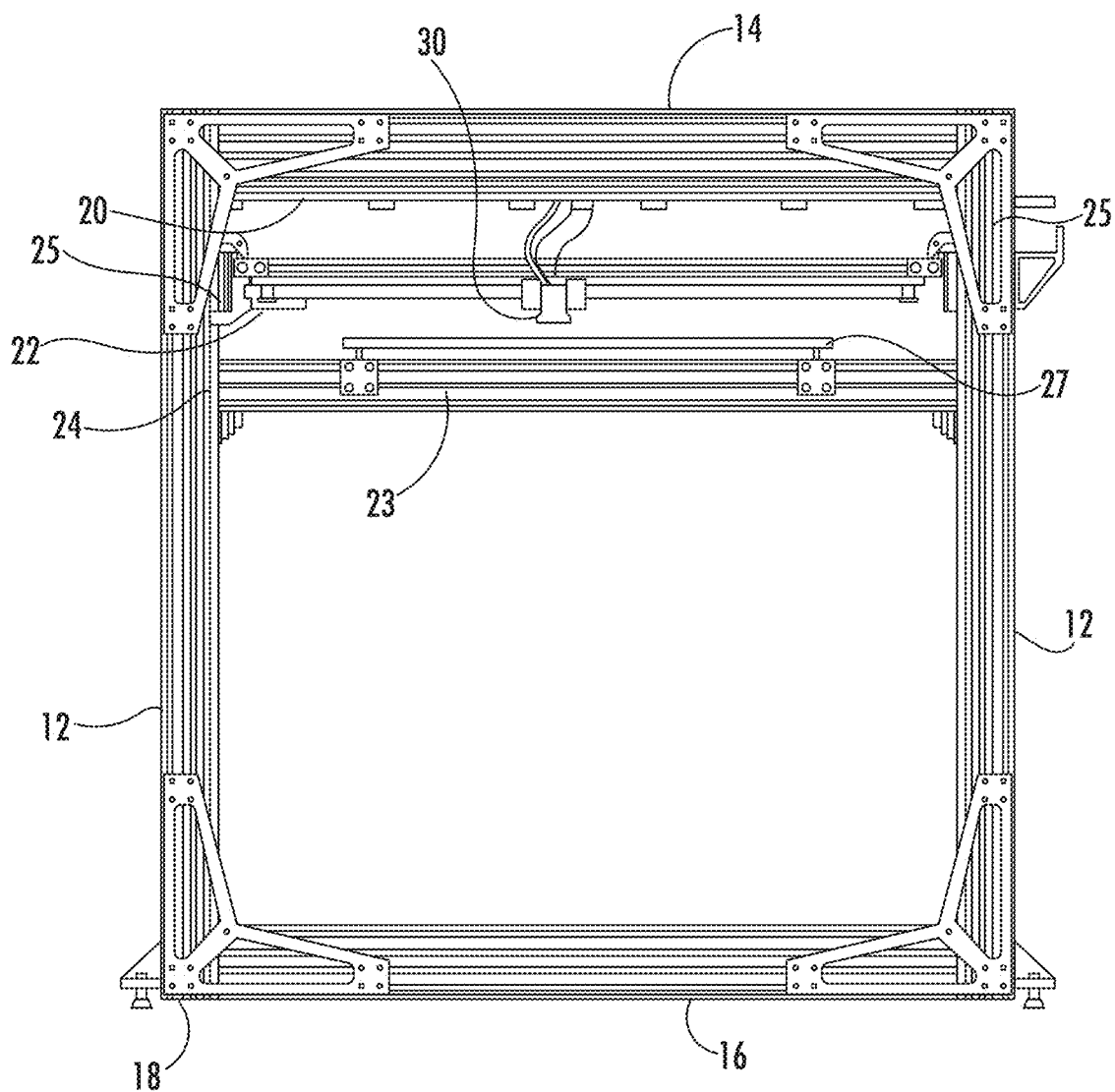
FIG. 2 is a front view of the exemplary CNC machine of FIG. 1.
Figure 3:
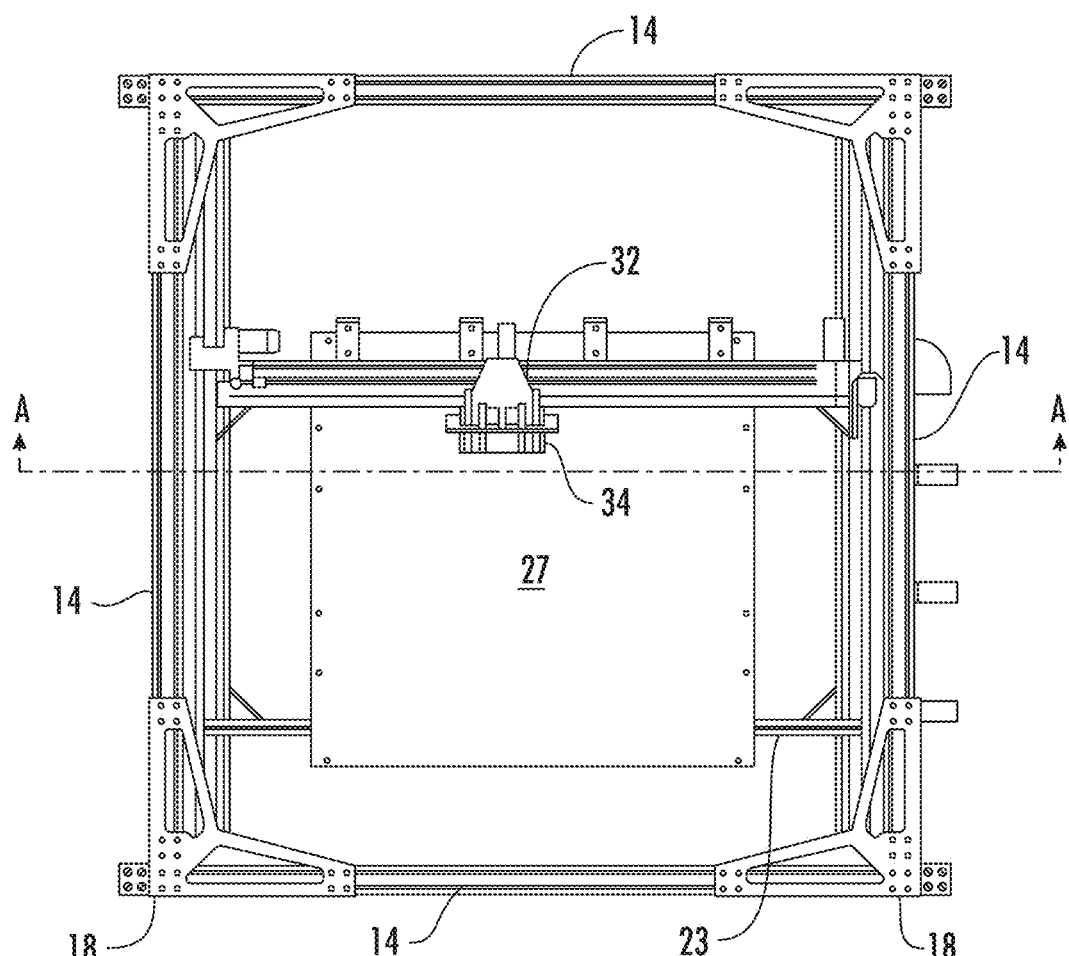
FIG. 3 is a top view of the exemplary CNC machine of FIG. 1.

Machine 1, shown in FIG. 1, may include a build platform 23 mounted to frame 10 via at least one transverse support member 24. Transverse support member 24 may be mounted to frame 10 between transversely spaced legs 12, which may correspond to the sides of machine 1. Build platform 23 may further include a worktable 27 (e.g., print bed) mounted on platform 23, as depicted in FIG. 2. This may cause to worktable 27 to be coupled to and positioned within the frame 10. In some embodiments, one or more portions of worktable 27 may extend slightly outside of the frame 10. In some embodiments, worktable 27 is configured such that applicator assembly 30 is disposed substantially at a center of worktable 27. Worktable 27 (e.g., print bed) may be formed from a material suitable for 3D printing (e.g., glass, aluminum, or a specialized print surface suitable for printing 3D components on). Worktable 27 may include a build surface or a support surface (not identified). The build surface may be disposed in a x-y plane, and may be fixed or displaceable along the x-, y-, or z-axes. For example, in a displaceable version, and in some embodiments of the present disclosure, transverse support members 24 may be displaceable along the z-axis (e.g., in the vertical direction). In some embodiments, support members 24, along with build platform 23, may be moved up or down the height of machine 1 via a linear actuator. The actuator may include belts, rack and pinions, ball screws, lead screw, cables, and/or linear motors to drive build platform 23, support members 24, and worktable 27 in an upward or downward direction (e.g., displaceable along the z-axis of the machine). In some other embodiments of the disclosure, worktable 27 may be displaceable along a set of rails mounted on frame legs 12. Displacement of worktable 27 may be achieved using one or more servomotors and one or more of these rails mounted on frame legs 12 and operatively connected to transverse support member 24 and/or build platform 23. In some embodiments of the present disclosure, worktable 27 (e.g., print bed) may be attached to building platform 23 by one or more adjustable mounts (not shown) to allow worktable 27 to be trammed (or leveled) relative to the second gantry (e.g., bottom gantry) to ensure the nozzle is continuously at the same distance from the surface of worktable 27 at any point in the build area during printing.

In some embodiments of the present disclosure, worktable 27 may include a print surface configured to include a heated belt system (not shown). In some embodiments, the heated belt system may operate similar to a belt in a treadmill. In some embodiments, the belt system may be bidirectional. In some embodiments, first and second gantries (e.g., gantry 20 and gantry 22, respectively) may be mounted at a 45 degree angle relative to the print surface (e.g., surface of the worktable). The printer (e.g., machine 1) may then print each layer of the printed part on the belt with the belt moving along as each layer is deposited. In other words, the belt may be continuously operational during layer-by-layer printing. In doing so, machine 1 may be able to print parts or components longer than the machine. Alternatively, in some embodiments of the disclosure, 3D printed parts or components may be printed continuously and may roll off the end of the belt as each part is printed one by one.

In some embodiments, a belt can be used with a more standard build plate to act as the print surface when stretched over and around the build plate. This way, when the belt is run the 3D printed parts or components will be automatically removed from the print surface when the belt curves around to the underside of the build plate. This has the added benefit of automatically unloading the part from the machine so long as the edge of the bed is outside of the machine or if there is some sort of guide shoot for the parts to fall onto leading out of the machine, in some examples.

With reference to FIG. 2, a first gantry 20 and a second gantry 22 is illustrated. First gantry 20 is coupled to and positioned within the frame 10. In some embodiments, one or more portions of first gantry 20 may extend slightly outside of the frame 10. First gantry 20 is disposed along the y-axis, causing a length of the first gantry 20 to extend along a first horizontal dimension of the frame 10 (e.g., a dimension along the y-axis). First gantry 20 may be mounted to frame top members 14. In some embodiments of the present disclosure, first gantry 20 is a high mass gantry and is disposed at the top of machine 1 and above second gantry 22. First gantry 20 is supported by frame top members 14, which transversely run along the sides of machine 1. In some embodiments, second gantry 22 may be attached or mounted to a top surface or top side of frame members 25.

In some embodiments of the present disclosure, first gantry 20 may be mounted to a linear motion system (or other motions system), e.g., at each end of gantry 20. This may allow the first gantry 20 to move back and forth along a second horizontal dimension of the frame 10 (e.g., a dimension along the x-axis). The linear motion system may include one or more of: linear guide rails, v-rail guides, guide rail shafts, or unsupported guide rods, in some examples. Rails may be disposed on an inner surface or a bottom surface of frame top members 14. First gantry 20 may either be fixedly or displaceably mounted, and, in some embodiments, may be disposed along the x-axis of machine 1. It can be appreciated that any suitable system that permits the translation of first gantry 20 along a first direction (e.g., x-axis) while limiting translation and rotation in all other directions (e.g., other axes) may be considered. First gantry 20 may also move along the linear motion system via a linear actuator (e.g., belts, rack and pinion, ball screws, lead screws, cables, and/or linear motors, etc.). Other suitable actuators may be used so long as these actuators induce a force on first gantry 20 in a precise and controlled manner over the distance of travel.

Figure 4:
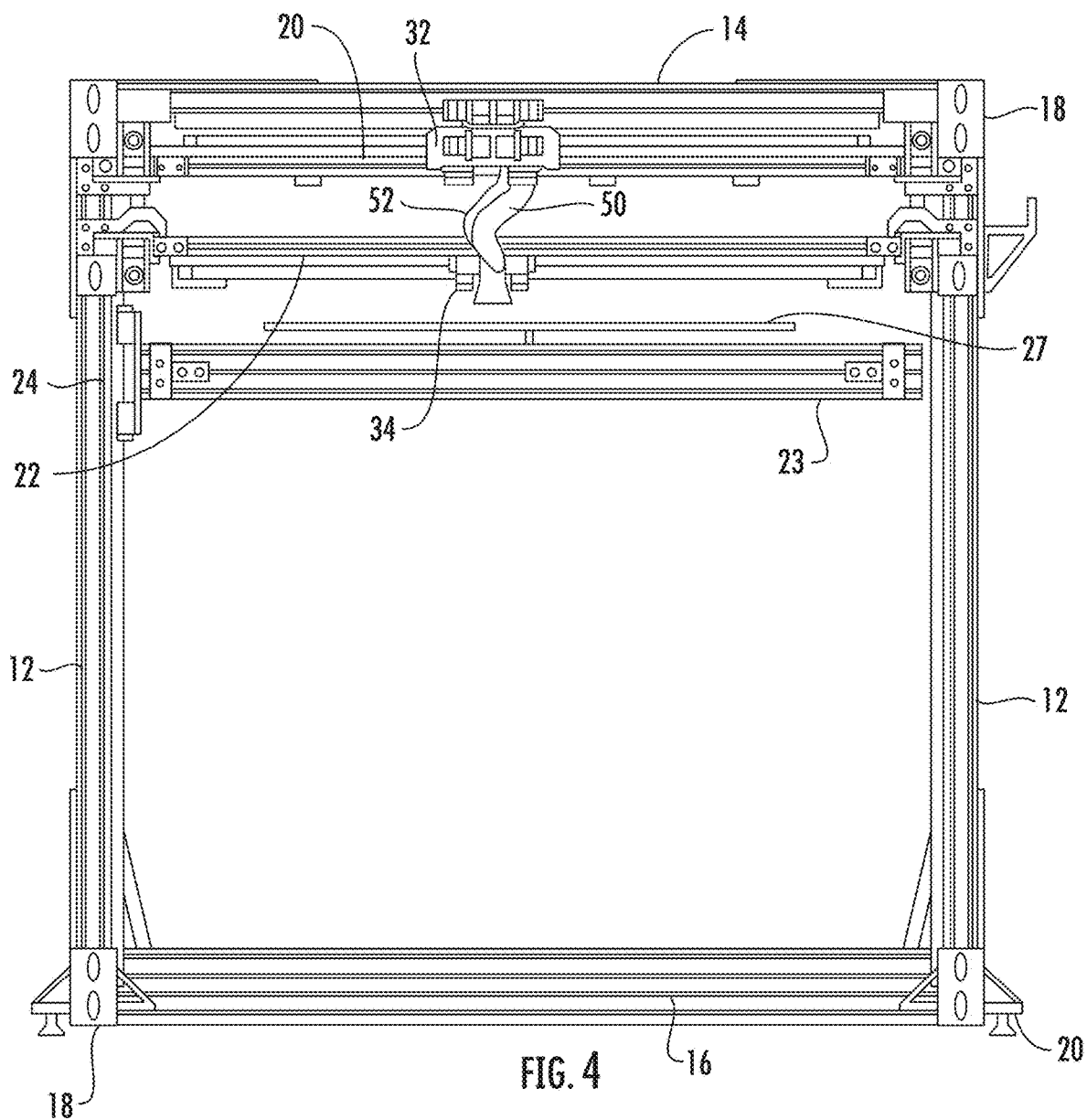
FIG. 4 is a cross-sectional view of the exemplary CNC machine of FIG. 1, taken along section AA of FIG. 3.
Figure 5:
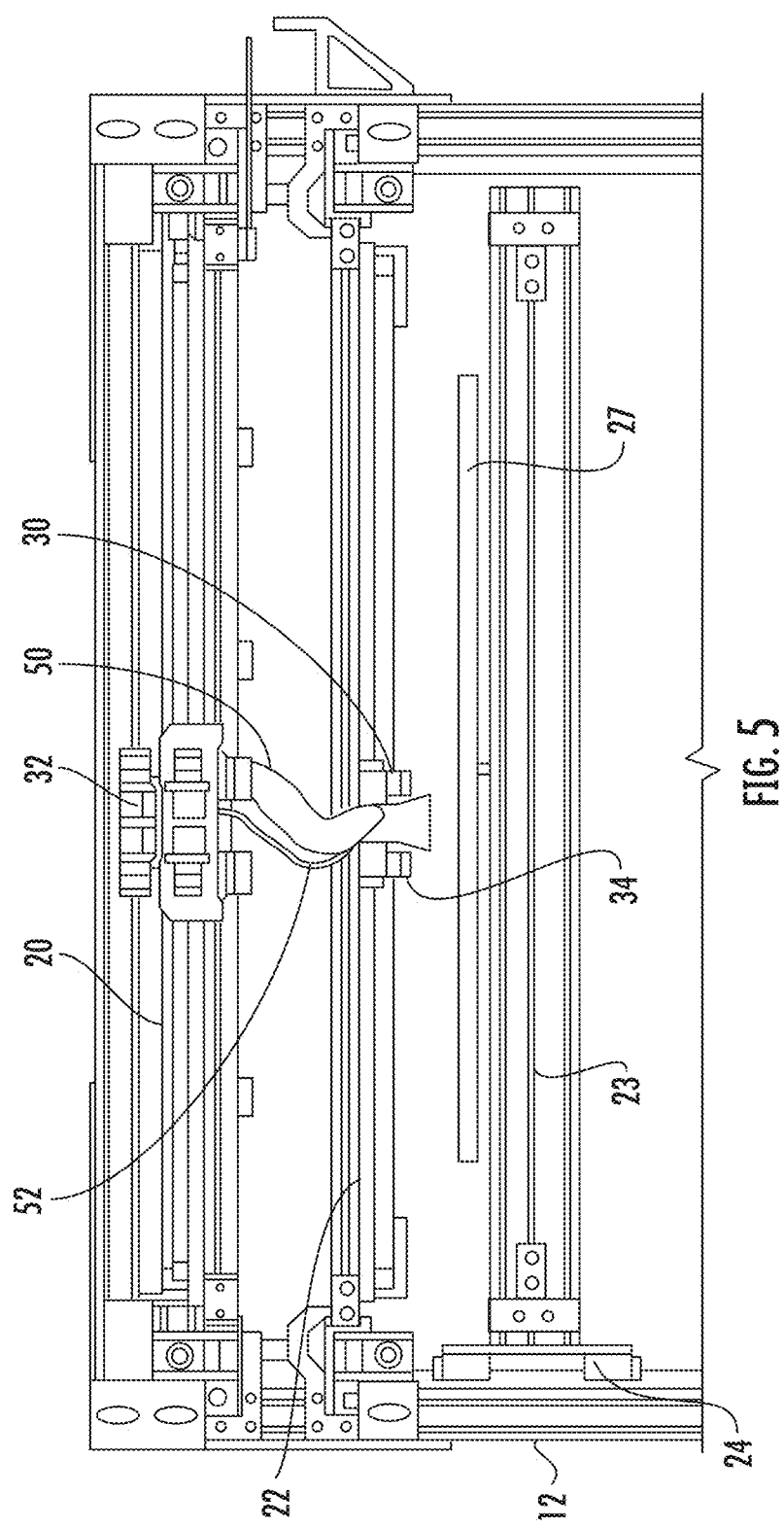
FIG. 5 is an enlarged view of a top portion of FIG. 4.
Figure 6:
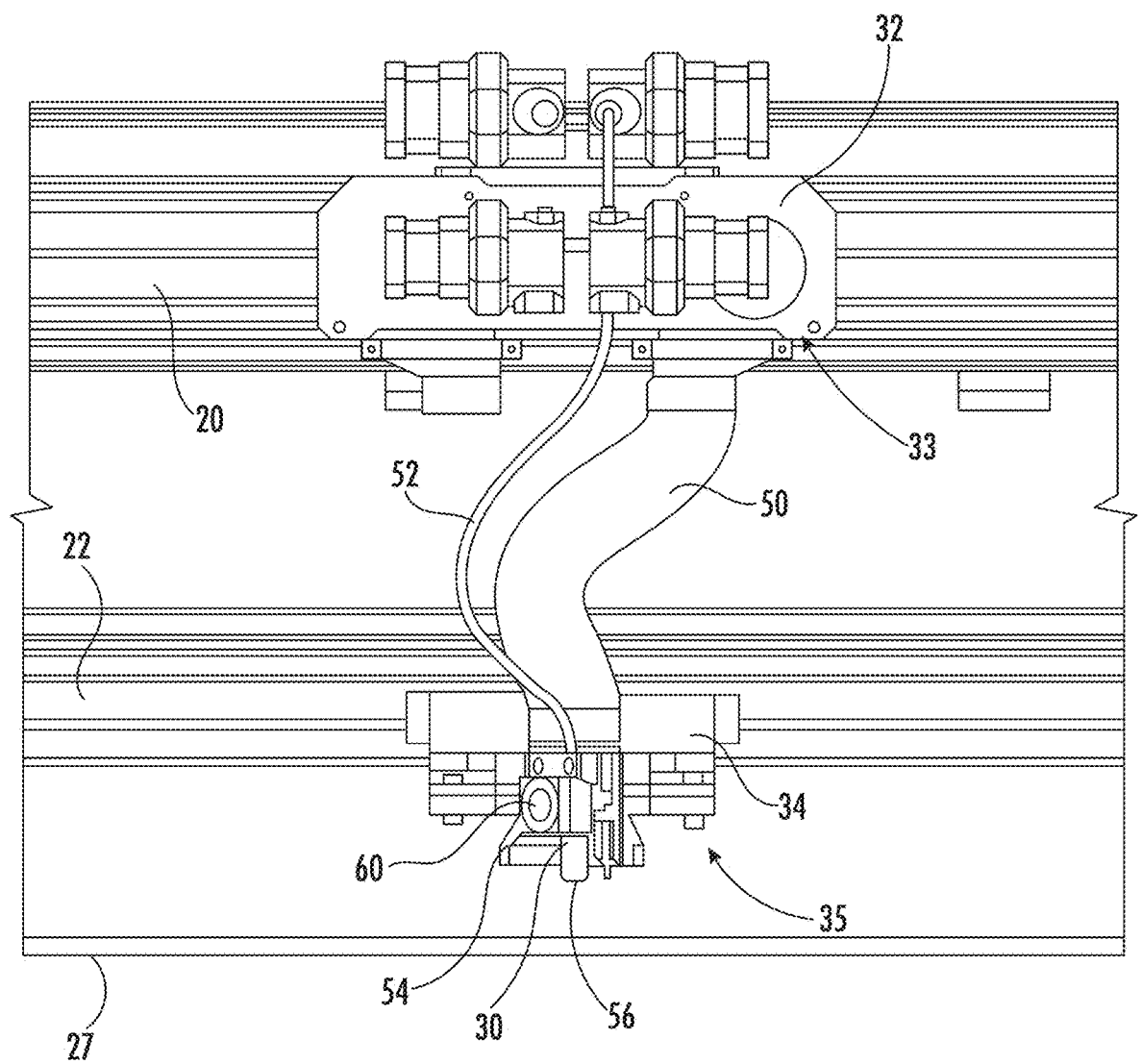
FIG. 6 is an enlarged perspective view of a first gantry with a first carriage mounted thereon, a second gantry with a second carriage mounted thereon, and a worktable of the exemplary CNC machine of FIG. 1.
Figure 8:
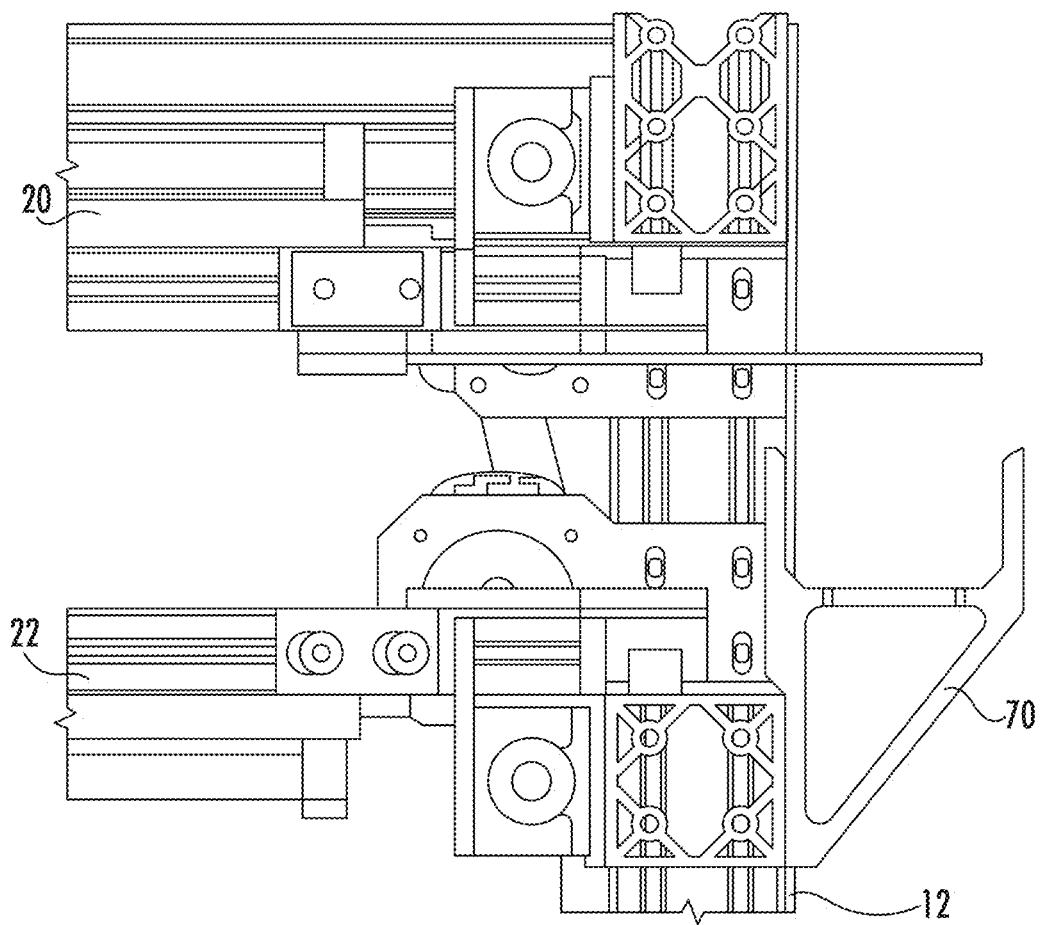
FIG. 8 is an enlarged view of a top right portion of FIG. 4.
Figure 9:
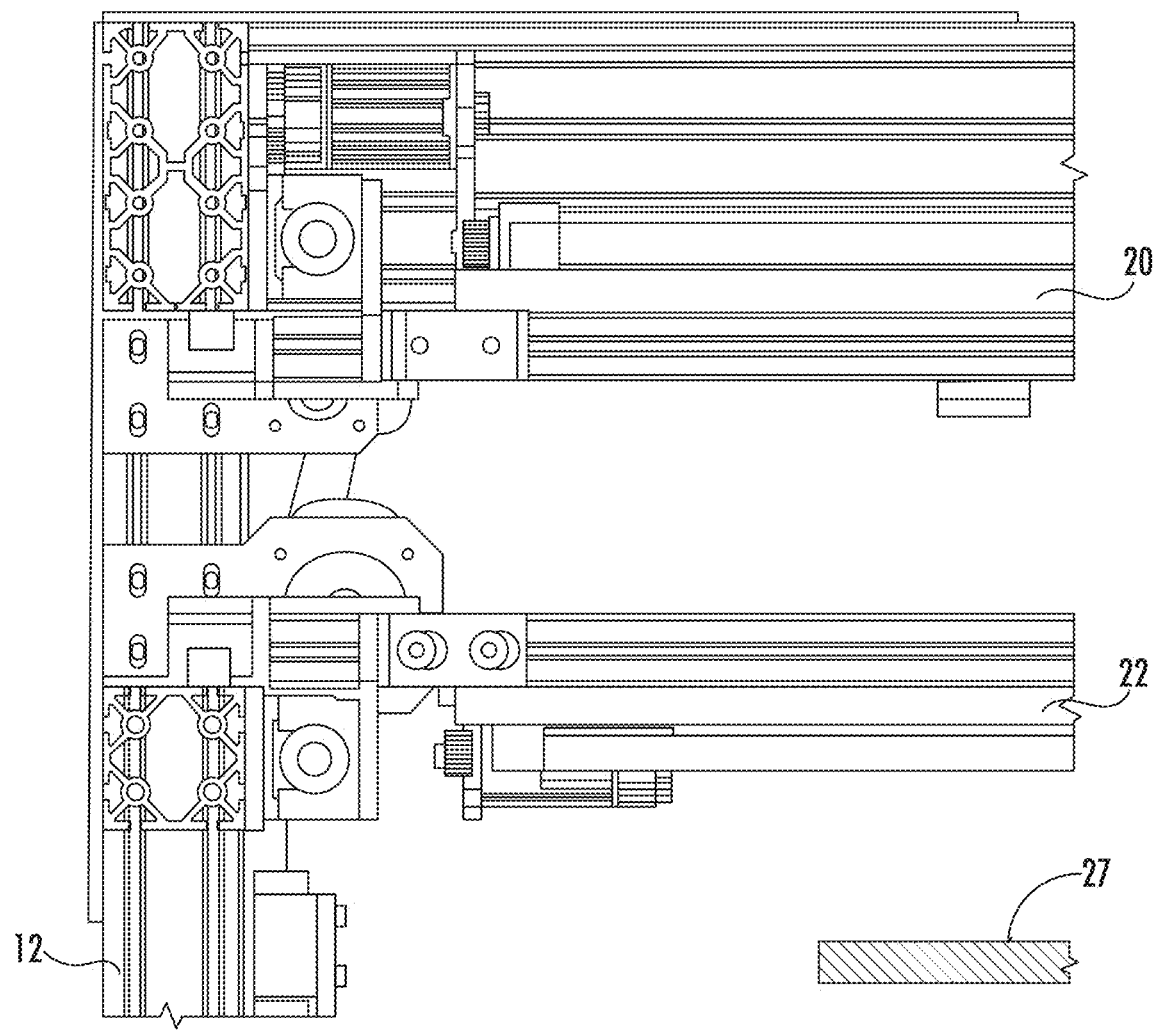
FIG. 9 is an enlarged view of a top left portion of FIG. 4.

A first carriage 32 may be mounted on first gantry 20, as illustrated in FIGS. 4 and 6. First carriage 32 may include a high mass carriage. First carriage 32 is supported on first gantry 20 and may be provided with a support member thereon. First carriage 32 is displaceable along one or more guide rails (or other suitable tracks). According to some embodiments of the present disclosure, first carriage 32 may provide the cross-axis motion for the equipment on first gantry 20. This may allow the first carriage 22 to move back and forth along the length of the first gantry 20 (e.g., in the first horizontal dimension of the frame 10, such as the y-axis). First carriage 32 may be displaceable along first gantry 20 via a linear motion guide or actuator (e.g., belts, rack and pinion, ball screws, lead screws, cables, and/or linear motors, etc.). First carriage 32 may be configured to carry one or more flowable material deliverers (e.g., extruders, hoppers), one or more fans, one or more associated cables/attachments, and all remaining connections to the rest of the printer (e.g., machine 1). Flowable material deliverers, fans, cables, and other attachments may be mounted as depicted by the figures or by any other suitable manner. First gantry 20 may also be configured to carry one or more hoses, tubes, and/or wires that may be required for the printer (e.g., machine 1) to operate, which are disposed within cable carriers; thus, allowing a connection from first gantry 20 to frame 10 without any entanglements or catches. In some embodiments of the disclosure, flowable material deliverers 33, fans, cables, and other attachments mounted to carriage 32 may be connected to a second carriage 34 mounted on a second gantry 22, as best depicted in FIG. 6. FIG. 6 depicts the flowable material deliverer(s) 33 as extruder(s) for a filament-based system, and further depicts the flowable material depositer(s) 35 as hotends. FIG. 17, on the other hand, depicts the flowable material deliverer(s) 33 as hopper(s) for a pellet-based system, and further depicts the flowable material depositer(s) 35 as auger extruder(s).

Figure 10:
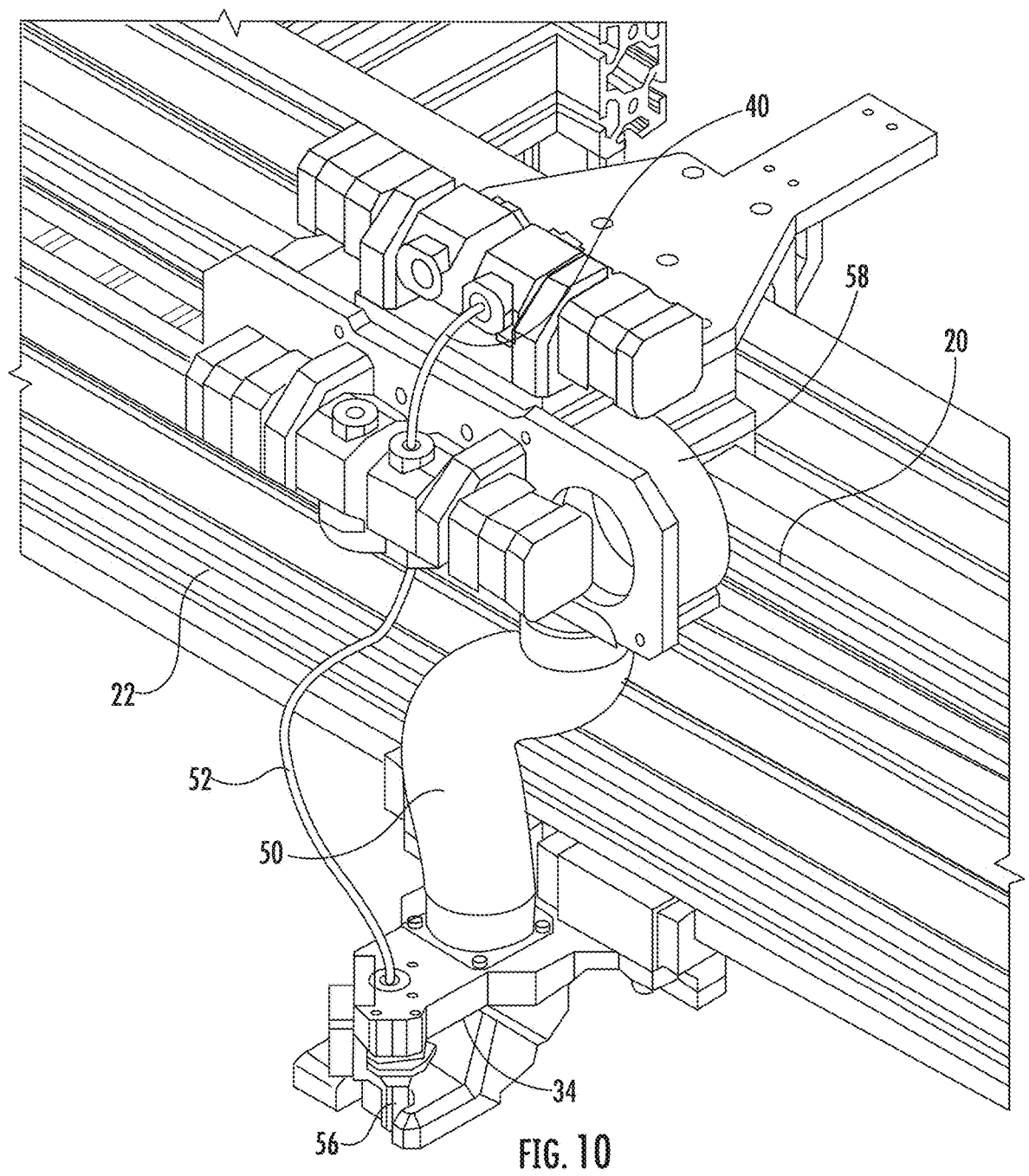
FIG. 10 is an enlarged perspective view of the exemplary CNC machine of FIG. 1.
Figure 11:
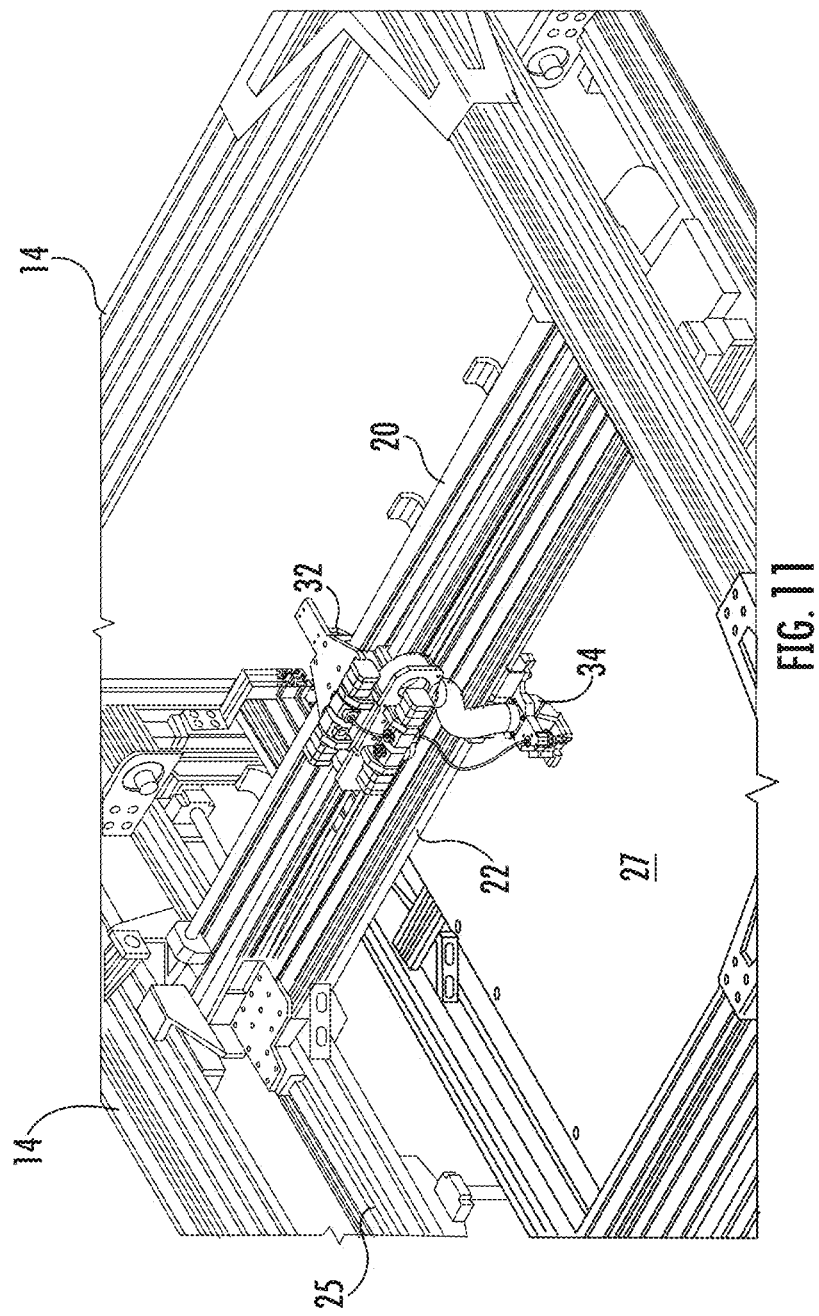
FIG. 11 is an enlarged perspective view of the exemplary CNC machine of FIG. 1.
Figure 12:
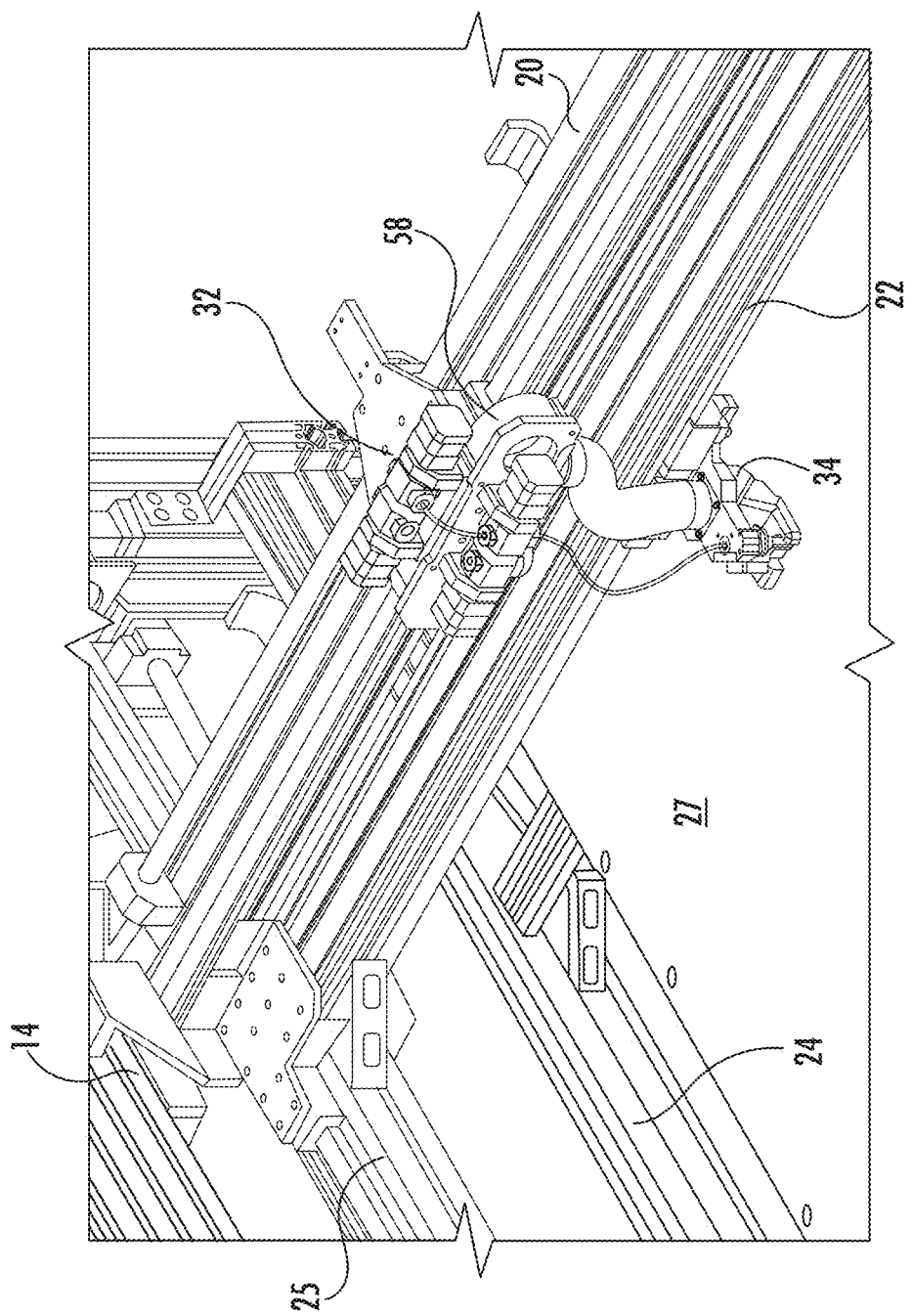
FIG. 12 is an enlarged perspective view of the exemplary CNC machine of FIG. 1.

One or more flexible tubes mounted to first carriage 32 may be connected to second carriage 34 to provide the extruded flowable material (e.g., melted thermoplastic pellets, metallic-filled filaments, thermosets, cement, etc.). For example, a flexible connector tube 40 is illustrated in FIG. 10. Tube 40 may comprise two ends, one end connected to a first Bondtech extruder, and a second end connected to a second Bondtech extruder. Tube 40 may connect the two Bondtech extruders in series with one feeding into the next to double the pulling/pushing force. In some embodiments, the two Bondtech extruders may be replaced with a single larger servo based extruder. In other embodiments, two smaller extruders may be used to ensure there is sufficient force to both pull the filament all the way through the tubing leading to the extruder and to drive the filament through the hotend. In an exemplary embodiment, filament may not be melted when traveling through the one or more flexible tubes. In some examples, the filament may be melted immediately before exiting the nozzle. The one or more flexible tubes may permit non-melted material (e.g., filament) to travel from the first gantry 20 (e.g., top gantry) to the second gantry 22 (e.g., bottom gantry).

In some embodiments of the disclosure, hoses may operatively connect first carriage 32 to second carriage 34 to provide airflow to cool the deposited heated extruded flowable material. Wires may be employed to operatively connect first carriage 32 to second carriage 34, to connect to sensors mounted on a hotend of second carriage 34. In some embodiments of the present disclosure, wires may operatively connect first carriage 32 to second carriage 34 to power the hotend of the extruder disposed within second carriage 34. Wires may also be operatively connected to control the rate of deposition of extruded flowable material from applicator assembly 30, which is operatively mounted to second carriage 34. The weight of these hoses, tubes, and/or wires is held up via first carriage 32 of first gantry 20.

Second gantry 22 is coupled to and positioned within the frame 10. In some embodiments, one or more portions of second gantry 22 may extend slightly outside of the frame 10. Second gantry 22 is also disposed along the y-axis, causing a length of the second gantry 22 to extend along the first horizontal dimension of the frame 10 (e.g., a dimension along the y-axis). In other embodiments, second gantry 22 may be disposed along the x-axis, causing the length of the second gantry 22 to extend along a second horizontal dimension of the frame 10 (e.g., a dimension along the x-axis). Second gantry 22 may be mounted to transverse frame member 25. Transverse frame member 25 may be mounted between transversely spaced frame legs 12, as depicted. Second gantry 22 may then be mounted to transverse frame member 25, as depicted. Transverse frame member 25 may be an independent frame member in some embodiments of the present disclosure, and may be disposed along either or both sides of machine 1. Transverse frame member 25 may be disposed far enough below the top of machine 1 to provide sufficient space for equipment to be stored above gantry 22. Yet in some other embodiments of the present disclosure, first gantry 20 may be mounted to a top surface of transverse frame member 25, while second (bottom) gantry 22 may be mounted to a corresponding bottom surface of transverse frame member 25. In some embodiments of the present disclosure, second gantry 22 is a high acceleration gantry and is disposed towards the top of machine 1, but below first gantry 20, as illustrated in FIG. 6.

Second gantry 22 may be mounted to a linear motion system (or other motions system), e.g., at each end of gantry 22. This may allow the second gantry 22 to move back and forth along the second horizontal dimension of the frame 10 (e.g., a dimension along the x-axis). In other embodiments where the length of the second gantry extends along the second horizontal dimension of the frame 10 (e.g., a dimension along the x-axis), this may alternatively allow the second gantry 22 to move back and forth along the first horizontal dimension of the frame 10 (e.g., a dimension along the y-axis). The second gantry 22 may employ the linear motion system described above with respect to first gantry 20. In some embodiments, guide rails may be disposed on an inner surface or top surface of transverse frame members 25. Second gantry 22 may either be fixedly or displaceably mounted, and, in some embodiments, may be disposed along the x-axis of machine 1. It can be appreciated that any suitable system that permits the translation of second gantry 22 along a first direction (e.g., x-axis) while limiting translation and rotation in all other directions (e.g., other axes) may be considered. Second gantry 22 may also move along the linear motion system via the linear actuators described with respect to first gantry 20. In some embodiments, the second gantry 22 is coupled to the frame 10 in a location that is vertically below that of the first gantry 20 in a vertical dimension (z-axis) of the frame 10. Second gantry 22 is spaced a sufficient vertical distance from first gantry 20. In some embodiments, the vertical distance between the first and second gantries 20, 22 may be about 100 mm to about 150 mm (e.g., 100 mm+/−10 mm to 150 mm+/−10 mm). In some examples, this distance may be as short as possible while still having space for the flexible connections as taught herein to have the freedom to move. The greater the space, or distance, the more freedom of movement between the carriages, which may require a longer filament tube.

Second gantry 22 includes second carriage 34, as illustrated in FIG. 6. Second carriage 34, in an aspect according to the present disclosure, is lighter in weight than first carriage 32 because second carriage 34 may include the flowable material depositer (e.g., hotend of the extruder, auger extruder) and any associated mounting structure (e.g., mounting hotend to second carriage 34, mounting second carriage 34 to second gantry 22, etc.). Second carriage 34 may be displaceable along second gantry 22 using one or more means described with respect to first carriage 32 and first gantry 20. This may allow the second carriage 34 to move back and forth along the length of the second gantry 22 (e.g., in the first horizontal dimension of the frame 10, such as the y-axis). In one aspect of the present disclosure, second carriage 34 may be designed to be light weight such that its purpose is to move the working end around the build area to deposit the heated, flowable material onto workable 27. Working end may include components of the printer of machine 1 that correspond to extruding heated flowable material from the hotend of an extruder, but not the upper components (e.g., coldend of the extruder, including stepper motor, roller, filament, etc.). In doing so, the bottom or second carriage 34 may be designed to be as light as possible by having the top or first carriage 32 carry all supporting equipment associated with additive manufacturing technologies. In an exemplary embodiment, second carriage 34 may include just the flowable material depositer(s) (e.g., hotend (s), auger extruder(s)) sensor(s), fan shrouds for cooling the printed part, and any associated support structure to mount the foregoing components to second carriage 34. Associated mounting or support structure may include any material strong enough to support the loads placed on second carriage 34. For example, associated mounting or support structure may be formed from wood, plastic, and/or metal if properly designed.

Some embodiments of the present disclosure may include a single hotend 56 disposed on second carriage 34 with a single extruder disposed on first carriage 32, as illustrated in FIGS. 6 and 7. Alternatively, some embodiments of the present disclosure may employ multiple extruders with corresponding multiple hotends. As previously described, pellets may be fed down to the second gantry 22 from the first gantry 20 as more filament or plastic is needed for extrusion. In some embodiments as taught herein, a pellet extruder may be disposed within (or on) second carriage 34. In such a scenario, first carriage 32 may carry a hopper and/or a collection system, and may include associated flexible tubing connecting the hopper to the extruder so that the pellets can be fed to the extruder during operation. This is illustrated in FIG. 17.

With continuing reference to FIG. 6, flexible tubes may be used to connect the flowable material (e.g., thermoplastic pellets, filament, thermosets, concrete, etc.) from first carriage 32 to the hotend (e.g., heated nozzle 56) of second carriage 34. In an aspect of the present disclosure, a short filament tube 52 (e.g., a short Bowden tube) may be employed by machine 1 to feed/guide filament from the extruder of first carriage 32 to the hotend of second carriage 34. As shown in the figures, filament may be fed down the filament tube 52 (e.g., a Polytetrafluoroethylene (PTFE) tube, a Bowden tube, etc.) to the hotend. In some embodiments, where pellets are used, pellets may use a larger feed tube using gravity to guide the plastic down. In some embodiments taught herein, a short filament tube 52 may be preferred over a longer filament tube because a longer filament tube may introduce problems or complications during operation of machine 1, such as, e.g., tangles, catches, reduced print quality, lower material control, difficulty in printing flexible or semi-flex materials, etc. In having two gantries spaced apart along the z-axis, and having the extruder disposed within (or on) first carriage 32 of first gantry 20 and the hotend disposed within (or on) second carriage 34 of second gantry 22, a longer filament tube may be avoided and a short filament tube 52 (or other short tube) may be employed, as depicted in FIG. 6. In some examples, a filament tube (or other tube) may be considered long if the tube length is over 500 mm. At about 700 mm, extruders may begin to experience problems with force needed to push the filament through to tube and/or to do effective retractions during printing. In some examples, a short filament tube may have a tube length that is less than or equal to 500 millimeters. For example, a short filament tube may have a tube length that is less than or equal to 450 millimeters, 400 millimeters, 350 millimeters, 300 millimeters, or any other tube length that is less than or equal to 500 millimeters. In some examples, the filament tube (or other tube) may not be a short filament tube (or other tube). As such, it may have a tube length greater than 500 millimeters.

A flexible blow hose 50 may also be used by machine 1 to cool the part as it is printed. A blower fan 58, as depicted in FIG. 10, may connect a large flexible tubing (e.g., flexible blow hose 50) to the first carriage 32. In some embodiments, fans, if using multiple extruders, may be disposed within (or on) top/first carriage 32 of first gantry 20, to avoid adding the additional mass of the blower fan, or fans, to the bottom/second carriage 34 of second gantry 22; thus, further reducing the weight of the second carriage 34 and second gantry 22. As heated flowable material exits nozzle 62 of applicator assembly 30, as shown in FIGS. 6 and 7, it may be necessary to cool the heated deposited flowable material (deposited on worktable 27, or on an object on the worktable 27) in order to lock the deposited material (e.g., melted thermoplastic material, metal-filled filaments, thermosets, concrete, etc.) in the correct or desired location and/or orientation. Blower fan 58 may be mounted to first carriage 32 so that the weight of the fan is distributed to first gantry 20, and not to second gantry 22 or second carriage 34. During operation of machine 1, the air being provided by the blower fan, through flexible blow hose 50, exits a shroud 54 around nozzle 62. The shroud 54 may at least partially surround the nozzle 62. In other embodiments, the shroud 54 may not surround the nozzle 62 at all, but may be pointed at the nozzle 62. Shroud 54 may be used to direct the airflow to a limited area surrounding nozzle 62. Shroud 54 may be removably attachable to applicator assembly 30, or removably attachable to flexible blow hose 50. Shroud 54 may incorporate multiple designs wherein each design may include its own airflow profile in order to optimize airflow over and around the area surrounding nozzle 62.

Figure 13:
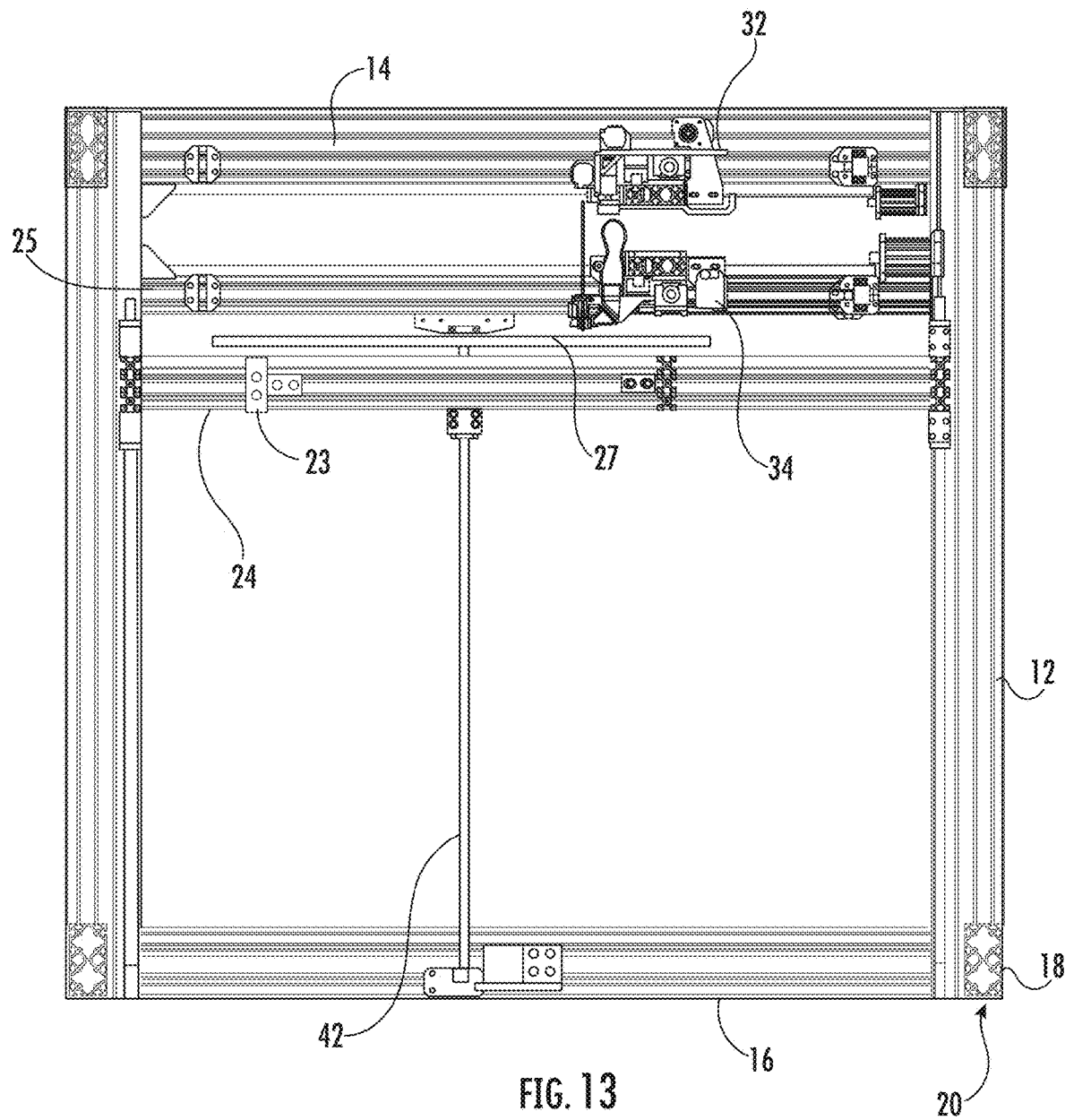
FIG. 13 is side cross-sectional view of the exemplary CNC machine of FIG. 1.
Figure 14:
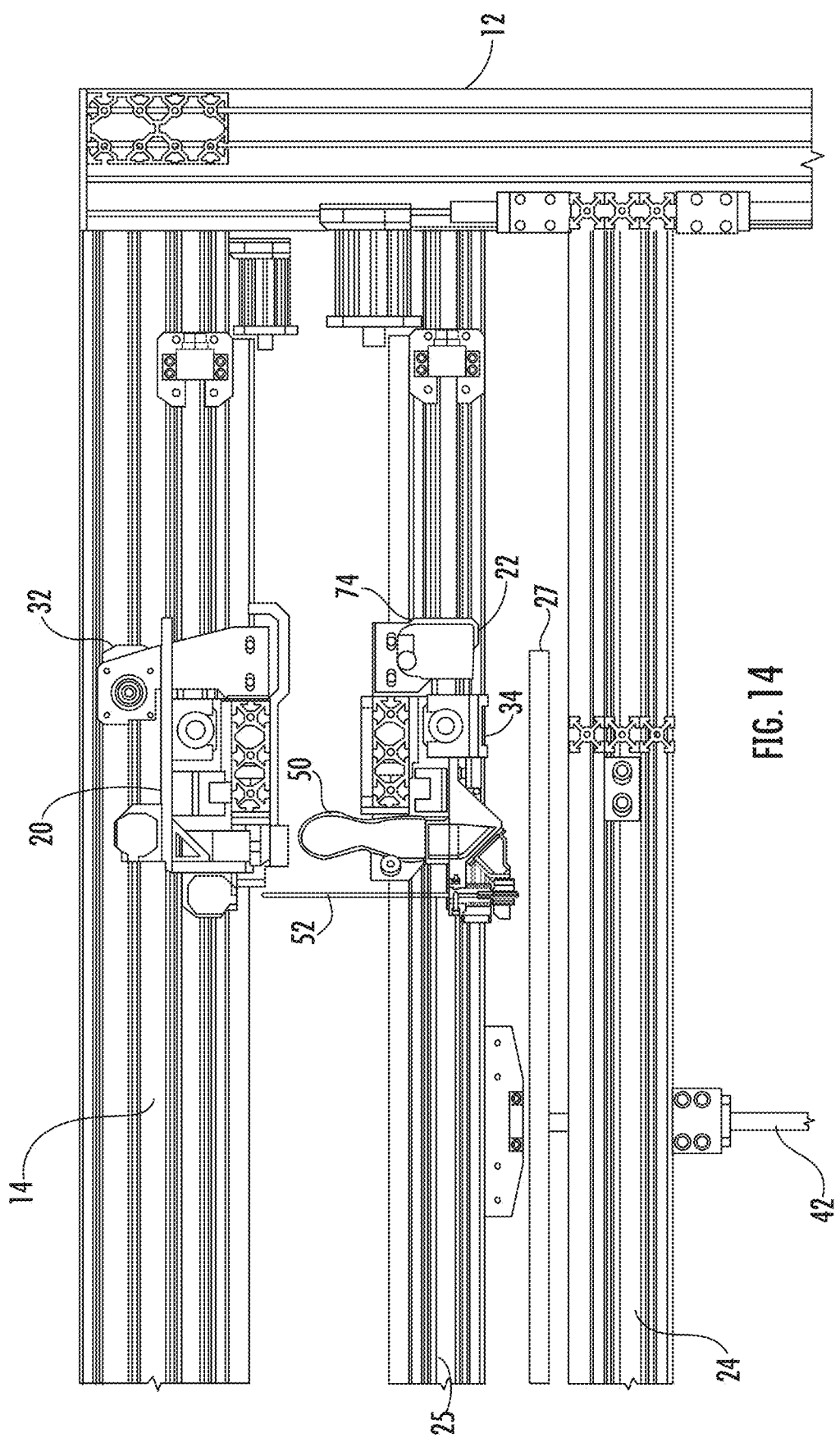
FIG. 14 is a cross-sectional view of the exemplary CNC machine of FIG. 1.

FIGS. 8-9 and 11-13 further illustrate various perspective views of machine 1. FIG. 10 illustrates an enlarged perspective view of second carriage 34 mounted on second gantry 22. As illustrated in FIG. 10, a short filament tube 52 (e.g., a short Bowden tube) connects the extruder with the hotend of machine 1. FIGS. 13 and 14 illustrate a ball screw 42. In some embodiments, ball screw 42 may be configured to drive the build platform (e.g., worktable 27) up and/or down along the z-axis.

FIGS. 14-16 further illustrate additional perspective and cross-sectional views of machine 1. FIG. 14 depicts a servomotor 74 according to embodiments taught herein.

FIGS. 14 and 16 illustrate the positional relationship between first gantry 20 and second gantry 22. As illustrated, and according to embodiments taught herein, first gantry 20 is the top gantry and second gantry 22 is the bottom gantry. In an exemplary embodiment, and owing to the close positional relationship between the two gantries, a shorter filament tube 52 (e.g., a short Bowden tube) or other tube may be used with machine 1.

As previously mentioned, executable software may be employed during operation of machine 1 to generate a tool path for printing a desired 3D part or component. In an exemplary embodiment, gantries 20 and 22 may be run by the same controller and off the same g-code. The hotend of second carriage 34 of second gantry 22 may follow a tool path of the actual 3D part or component to be printed, while the extruder of first carriage 32 of first gantry 20 may follow a modified tool path. In another embodiment, second gantry 22 (and second carriage 34) may follow a tool path of the actual part to be printed, while first gantry 20 (and first carriage 32) may follow a modified tool path. In both cases, the modified tool path is a low pass filter tool path intended to reduce the accelerations and high drive forces associated with abrupt changes in direction while keeping the extruder "hovering" above the hotend within the allowable distances of the flexible connections (e.g., short filament tube, flexible blow hose, and associated wires, etc.).

In an exemplary embodiment, machine 1 may operate at a high efficiency if a g-code post processor is used. A g-code post processor may create a new file for the whole printer based on the original file produced by the slicer. This new file includes movement instructions for the first gantry 20 (e.g., top gantry) based on the path needed to make the part, which the second gantry 22 (e.g., bottom gantry) will be following. The first gantry 20's path may be made to reduce accelerations as much as possible while keeping the first carriage 32 (e.g., top carriage) within the limits of the flexible connections to the second carriage 34 (e.g., bottom carriage). In doing so, this path may allow the first carriage 32 to "hover" above the second carriage 34 with the minimum amount of motor forces needed while the second carriage 34 runs the path to create the part as fast as the printer can operate. The post processor may either be a stand-alone program or may be integrated into the slicer itself. Once the g-code for the whole printer has been created, the printer may then be run by any controller with enough axis control to run the whole machine (e.g., machine 1). The post processor takes the X and Y values of the part path, for the second gantry 22 (e.g., bottom gantry), and runs them through an algorithm to generate new X and Y values for the path of the first carriage 32 (e.g., top carriage) to allow the first carriage 32 to stay above the second carriage 34 (e.g., bottom carriage) with as little movement as possible. These values are assigned new identifiers such as A and B, or something similar, so that the controller knows which values are for which axis of motion.

According to some embodiments of the present disclosure, a less efficient, but still effective system, may be to run the same path for both first gantry 20 and second gantry 22 with the first gantry 20 not being able to hit the high accelerations needed to fully run the path. In some embodiments, the system may still need the original g-code for the part path to be run through a post processor to add in the code for the first gantry 20; however, unlike the above example, which used the original g-code to make a new path, this system may just copy and paste the X and Y values into a new axis for the first gantry 20. In some embodiments, the first gantry 20 may also be directly controlled by firmware.

This firmware may be used to keep the first gantry 20 within range of the flexible connections while also keeping drive forces to a minimum. In an embodiment, a proportional integral derivative (PID) position control system may be used. This position control system may look ahead at the lines of g-code about to be executed in order to determine where the second gantry 22 is going (e.g., positional movement). In response, the position control system may then move the first gantry 20 to stay above or nearly above the second gantry 22. In some embodiments, the aforementioned system may eliminate the need for a post processor and may allow the printer to run with a standard slicer generated g-code file.

Modifications, additions, or omissions may be made to the machine 1 of FIGS. 1-17 without departing from the scope of the disclosure. For example, although the first carriage 32 is described above as including a single flowable material deliverer, and the second carriage 34 is described above as including a single flowable material depositer, any number of flowable material deliverers and flowable material depositers may be positioned on the first and second carriages 32, 34, respectively.

As another example, although first gantry 20 and second gantry 22 are described above as both being powered gantries, in some examples, the first gantry 20 (e.g., top gantry) may be a non-powered gantry. In such an example, the powered second gantry 22 may be used to push or otherwise move the first non-powered gantry 20. To do so, the first non-powered gantry 20 may be coupled to the second powered gantry 22 by one or more springs (e.g., pushing on plates), cables, bungies, or other device. This coupling may allow the first non-powered gantry 20 to be moved, while minimize forces on the first non-powered gantry 20. To push or otherwise move the first non-powered gantry 20, the second powered gantry 22 may utilize larger motors, because the motors would be moving the mass of both gantries 20, 22. In some embodiments, a spring-based connection between the gantries 20, 22 may limit the acceleration needs when pushing the first non-powered gantry 20 since the spring(s) would extend the acceleration distance. In such embodiments, this set-up may cause the first non-powered gantry 20 to not move at all (e.g., completely stationary) when the second powered gantry 22 is performing lots of small, fast movements in one area of the print, so long as the movements of the second powered gantry 22 were not reaching the boundaries of the "flex zone". This may mean that the motor(s) of the second powered gantry 22 would be moving the mass of the whole system during longer movements.

In this specification, the use of the singular includes the plural unless specifically stated otherwise. The use of "or" means "and/or" unless stated otherwise. Furthermore, the use of the term "including", as well as other forms, such as "includes" and "included", is not limiting. Any range described herein will be understood to include the endpoints and all values between the endpoints. Also, the section headings used herein are for organizational purposes only and are not to be construed as limiting the subject matter described.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. An additive manufacturing device, comprising:
a frame comprising a plurality of legs, a plurality of top members, and a plurality of bottom members, the plurality of legs coupling the plurality of top members to the plurality of bottom members;
a worktable coupled to and positioned within the frame, the worktable being configured to move upward and downward along a vertical dimension of the frame;
a top gantry coupled to and positioned within the frame, the top gantry having a length that extends along a first horizontal dimension of the frame, the top gantry being configured to move back and forth along a second horizontal dimension of the frame;
a top carriage coupled to the top gantry, the top carriage being configured to move back and forth along the length of the top gantry in the first horizontal dimension of the frame;
a bottom gantry coupled to and positioned within the frame in a location that is vertically below the top gantry in the vertical dimension of the frame, the bottom gantry having a length that extends along the first horizontal dimension of the frame, the bottom gantry being configured to move back and forth along the second horizontal dimension of the frame;
a bottom carriage coupled to the bottom gantry, the bottom carriage being configured to move back and forth along the length of the bottom gantry in the first horizontal dimension of the frame;
a flowable material deliverer coupled to the top carriage;
a flowable material depositer coupled to the bottom carriage;
a tube coupling the flowable material deliverer of the top carriage to the flowable material depositer of the bottom carriage, the tube being configured to guide a flowable material from the flowable material deliverer to the flowable material depositer, the flowable material depositer being configured to at least partially melt the flowable material for deposit on the worktable or on an object on the worktable, wherein the flowable material deliverer comprises an extruder configured to provide the flowable material to the flowable material depositer through the tube or comprises a hopper configured to store a supply of the flowable material for providing to the flowable material depositer through the tube, wherein the flowable material depositer comprises a hotend or an auger extruder;
a blower fan coupled to the top carriage;
a shroud coupled to the bottom carriage so as to at least partially surround the hotend; and
a flexible blow hose coupling the blower fan of the top carriage to the shroud of the bottom carriage;
wherein the bottom gantry, the bottom carriage, the flowable material depositer, and the shroud have a combined weight that is less than a combined weight of the top gantry, the top carriage, the flowable material deliverer, and the blower fan.

2. An additive manufacturing device, comprising:
a frame;
a worktable coupled to the frame;
a first gantry coupled to the frame, the first gantry having a length that extends along a first horizontal dimension of the frame, the first gantry being configured to move back and forth along a second horizontal dimension of the frame;
a first carriage coupled to the first gantry, the first carriage being configured to move back and forth along the length of the first gantry in the first horizontal dimension of the frame;
a second gantry coupled to the frame, the second gantry having a length that extends along one of the first horizontal dimension of the frame and the second horizontal dimension of the frame, the second gantry being configured to move back and forth along the other of the first horizontal dimension of the frame and the second horizontal dimension of the frame;
a second carriage coupled to the second gantry, the second carriage being configured to move back and forth along the length of the second gantry;
a flowable material deliverer coupled to the first carriage;
a flowable material depositer coupled to the second carriage; and
a tube coupling the flowable material deliverer of the first carriage to the flowable material depositer of the second carriage, the tube being configured to guide a flowable material from the flowable material deliverer to the flowable material depositer, the flowable material depositer being configured to at least partially melt the flowable material for deposit on the worktable or on an object on the worktable.

3. The additive manufacturing device of claim 2, wherein the flowable material deliverer comprises an extruder configured to provide the flowable material to the flowable material depositer through the tube, and wherein the flowable material depositer comprises a hotend.

4. The additive manufacturing device of claim 2, wherein the flowable material deliverer comprises a hopper configured to store a supply of the flowable material for providing to the flowable material depositer through the tube, and wherein the flowable material depositer comprises an auger extruder.

5. The additive manufacturing device of claim 2, wherein the worktable is configured to move upward and downward along a vertical dimension of the frame.

6. The additive manufacturing device of claim 2, wherein the tube is a Polytetrafluoroethylene (PTFE) tube.

7. The additive manufacturing device of claim 2, wherein the tube has a length less than or equal to 500 millimeters.

8. The additive manufacturing device of claim 2, wherein the tube has a length greater than 500 millimeters.

9. The additive manufacturing device of claim 2, wherein the first gantry is a top gantry, and the second gantry is a bottom gantry positioned in a location that is vertically below the top gantry in a vertical dimension of the frame.

10. The additive manufacturing device of claim 9, wherein the location of the bottom gantry is vertically below the top gantry in the vertical dimension of the frame by about 100 millimeters to about 150 millimeters.

11. The additive manufacturing device of claim 2, wherein the second gantry, the second carriage, and the flowable material depositer have a combined weight that is less than a combined weight of the first gantry, the first carriage, and the flowable material deliverer.

12. The additive manufacturing device of claim 2, further comprising:
a blower fan coupled to the first carriage;
a shroud coupled to the second carriage; and
a flexible blow hose coupling the blower fan of the first carriage to the shroud of the second carriage.

13. The additive manufacturing device of claim 12, wherein:
the second carriage and the second gantry are configured to follow a tool path of a component being manufactured; and
the first carriage and the first gantry are configured to follow a modified tool path of the component being manufactured.

14. The additive manufacturing device of claim 2, wherein the flowable material deliverer is coupled on or in the first carriage, and the flowable material depositer is coupled on or in the second carriage.

15. The additive manufacturing device of claim 2, wherein the flowable material comprises thermoplastic pellets, metallic-filled filaments, thermosets, or concrete.

16. The additive manufacturing device of claim 2, wherein the length of the second gantry extends along the first horizontal dimension of the frame, and the second gantry is configured to move back and forth along the second horizontal dimension of the frame.

17. The additive manufacturing device of claim 2, wherein the length of the second gantry extends along the second horizontal dimension of the frame, and the second gantry is configured to move back and forth along the first horizontal dimension of the frame.

18. The additive manufacturing device of claim 2, wherein the both the first gantry and the second gantry are powered.

19. The additive manufacturing device of claim 2, wherein the first gantry is non-powered and the second gantry is powered.

20. A method, comprising:
coupling a worktable to a frame of an additive manufacturing device;
coupling a first gantry to the frame so that a length of the first gantry extends along a first horizontal dimension of the frame, the first gantry being configured to move back and forth along a second horizontal dimension of the frame;
coupling a first carriage to the first gantry, the first carriage being configured to move back and forth along the length of the first gantry in the first horizontal dimension of the frame;
coupling a second gantry to the frame so that a length of the second gantry extends along one of the first horizontal dimension of the frame and the second horizontal dimension of the frame, the second gantry being configured to move back and forth along the other of the first horizontal dimension of the frame and the second horizontal dimension of the frame;
coupling a second carriage to the second gantry, the second carriage being configured to move back and forth along the length of the second gantry;
coupling a flowable material deliverer to the first carriage;
coupling a flowable material depositer to the second carriage; and
coupling a tube to the flowable material deliverer and the flowable material depositer so that the tube couples the flowable material deliverer to the flowable material depositer, the tube being configured to guide a flowable material from the flowable material deliverer to the flowable material depositer, the flowable material depositer being configured to at least partially melt the flowable material for deposit on the worktable or on an object on the worktable.

\* \* \* \* \*